US012438288B2

(12) United States Patent
Wu

(10) Patent No.: US 12,438,288 B2
(45) Date of Patent: Oct. 7, 2025

(54) ANTENNA ASSEMBLY AND ELECTRONIC DEVICE

(71) Applicant: GUANGDONG OPPO MOBILE TELECOMMUNICATIONS CORP., LTD., Guangdong (CN)

(72) Inventor: Xiaopu Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 280 days.

(21) Appl. No.: 18/215,802

(22) Filed: Jun. 28, 2023

(65) Prior Publication Data

US 2023/0344151 A1 Oct. 26, 2023

Related U.S. Application Data

(63) Continuation of application No. PCT/CN2021/131176, filed on Nov. 17, 2021.

(30) Foreign Application Priority Data

Dec. 29, 2020 (CN) ........................ 202011613294.7

(51) Int. Cl.
*H01Q 21/30* (2006.01)
*H01Q 1/24* (2006.01)

(52) U.S. Cl.
CPC ............. *H01Q 21/30* (2013.01); *H01Q 1/243* (2013.01)

(58) Field of Classification Search
CPC ........ H01Q 1/243; H01Q 5/328; H01Q 21/30; H04B 1/0064; H01R 2201/02; H03J 2200/11
See application file for complete search history.

(56) References Cited

U.S. PATENT DOCUMENTS 10,200,092 B1 * 2/2019 Irci ...................... H04B 7/0413
10,431,872 B1 10/2019 Kim et al.
(Continued)

FOREIGN PATENT DOCUMENTS

CN 106450662 2/2017
CN 108987908 12/2018
(Continued)

OTHER PUBLICATIONS

EPO, Extended European Search Report for EP Application No. 21913563.9, Jun. 18, 2024.
(Continued)

*Primary Examiner* — Monica C King
(74) *Attorney, Agent, or Firm* — Hodgson Russ LLP

(57) ABSTRACT

An antenna assembly and an electronic device are provided in the disclosure. The antenna assembly includes a first antenna element, a second antenna element, and a third antenna element. The first antenna element includes a first radiator. The second antenna element includes a second radiator. A first gap is defined between one end of the second radiator and one end of the first radiator, and at least part of the second radiator is configured to be coupled to the first radiator through the first gap. The third antenna element includes a third radiator. A second gap is defined between the third radiator and the other end of the second radiator, and at least part of the third radiator is configured to be coupled to the second radiator through the second gap.

20 Claims, 16 Drawing Sheets

(56) References Cited

U.S. PATENT DOCUMENTS

| | | | |
|---|---|---|---|
| 2015/0380812 A1 | 12/2015 | Black et al. | |
| 2016/0226143 A1 | 8/2016 | Chen et al. | |

FOREIGN PATENT DOCUMENTS

| | | | |
|---|---|---|---|
| CN | 109921174 | 6/2019 | |
| CN | 110247160 | 9/2019 | |
| CN | 110875512 | 3/2020 | |
| CN | 111244616 | 6/2020 | |
| CN | 108281767 | 10/2020 | |
| CN | 112086752 | 12/2020 | |
| CN | 112086753 | 12/2020 | |
| CN | 112114202 | 12/2020 | |
| CN | 116565539 A * | 8/2023 | ............... H01Q 1/24 |

OTHER PUBLICATIONS

CNIPA, First Office Action for CN Application No. 202011613294.7, Jul. 4, 2022.

WIPO, International Search Report and Written Opinion for International Application No. PCT/CN2021/131176, Feb. 10, 2022.

* cited by examiner

ANTENNA ASSEMBLY AND ELECTRONIC DEVICE

CROSS-REFERENCE TO RELATED APPLICATIONS

The application is a continuation of International Application No. PCT/CN2021/131176, filed Nov. 17, 2021, which claims priority to Chinese Patent Application No. 202011613294.7, filed Dec. 29, 2020, the entire disclosures of which are incorporated herein by reference.

TECHNICAL FIELD

The disclosure relates to the field of communications technologies, and in particular, to an antenna assembly and an electronic device.

BACKGROUND

With the development of technologies, electronic devices such as mobile phones that have communication functions become more and more popular, and the functions become more and more powerful. The electronic device generally includes an antenna assembly to implement the communication function of the electronic device. How to improve communication quality of the electronic device and at the same time facilitate miniaturization of the electronic device becomes a technical problem to be solved.

SUMMARY

An antenna assembly and an electronic device are provided in the disclosure for improving communication quality and facilitating overall miniaturization.

In a first aspect, an antenna assembly is provided in implementations of the disclosure. The antenna assembly includes a first antenna element, a second antenna element, and a third antenna element. The first antenna element includes a first radiator. The second antenna element includes a second radiator. A first gap is defined between one end of the second radiator and one end of the first radiator. At least part of the second radiator is configured to be coupled to the first radiator through the first gap. The third antenna element includes a third radiator. A second gap is defined between the third radiator and the other end of the second radiator. At least part of the third radiator is configured to be coupled to the second radiator through the second gap. An electromagnetic wave signal transmitted and received by the second antenna element under a coupling between the second radiator and the third radiator cover at least a global positioning system (GPS)-L1 band, a wireless fidelity (Wi-Fi) 2.4 GHz band, a long-term evolution middle-high band (LTE-MHB), and a new radio middle-high band (NR-MHB).

In a second aspect, an electronic device is provided in the implementations of the disclosure. The electronic device includes a housing and the antenna assembly. The antenna assembly is at least partially integrated at the housing; or the antenna assembly is disposed inside the housing.

BRIEF DESCRIPTION OF THE DRAWINGS

To describe technical solutions in implementations of the disclosure more clearly, the following briefly introduces the accompanying drawings required for describing the implementations. Apparently, the accompanying drawings in the following description only illustrate some implementations of the disclosure. Those of ordinary skill in the art may also obtain other drawings based on these accompanying drawings without creative efforts.

DETAILED DESCRIPTION

The following clearly and completely describes the technical solutions in the implementations of the disclosure with reference to the accompanying drawings in the implementations of the disclosure. Apparently, the described implementations are merely a part rather than all of the implementations of the disclosure. The implementations described herein can be combined with each other appropriately.

Figure 1:
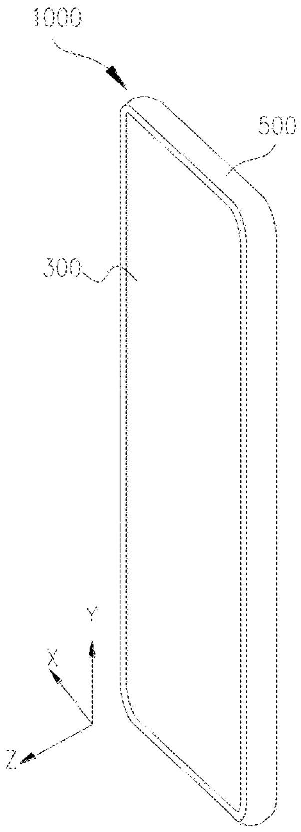
FIG. 1 is a schematic structural view of an electronic device provided in implementations of the disclosure.

Referring to FIG. 1, FIG. 1 is a schematic structural view of an electronic device 1000 provided in the implementations of the disclosure. The electronic device 1000 may be a device that can transmit/receive (transmit and/or receive) an electromagnetic wave signal, such as a telephone, a television, a tablet computer, a mobile phone, a camera, a personal computer, a notebook computer, an on-board equipment, an earphone, a watch, a wearable equipment, a base station, a vehicle-borne radar, and a customer premise equipment (CPE). Taking the electronic device 1000 as a mobile phone as an example, for ease of illustration, the electronic device 1000 is defined by taking the electronic device 1000 at a first view angle as a reference, a width direction of the electronic device 1000 is defined as an X direction, a length direction of the electronic device 1000 is defined as a Y direction, and a thickness direction of the electronic device 1000 is defined as a Z direction. A direction indicated by an arrow is a forward direction.

Figure 2:
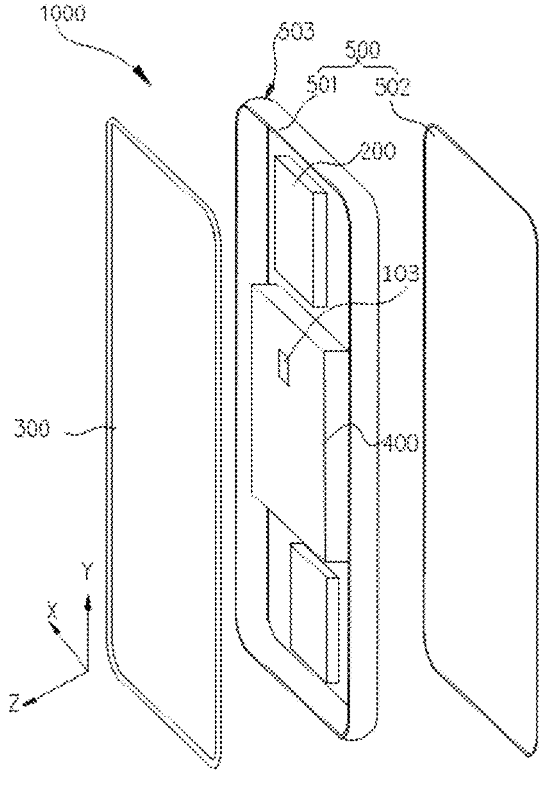
FIG. 2 is a schematic exploded view of the electronic device in FIG. 1.

Referring to FIG. 2, the electronic device 1000 includes an antenna assembly 100. The antenna assembly 100 is configured to transmit/receive a radio frequency (RF) signal to implement a communication function of the electronic device 1000. At least some components of the antenna assembly 100 are disposed at a main printed circuit board 200 of the electronic device 1000. It can be understood that, the electronic device 1000 further includes a display screen 300, a battery 400, a housing 500, a camera, a microphone, a receiver, a loudspeaker, a face recognition module, a fingerprint recognition module, and other components that can implement basic functions of a mobile phone, which are not described again herein.

Figure 3:
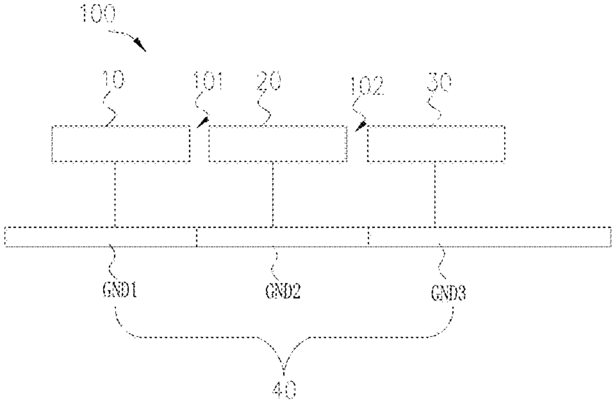
FIG. 3 is a schematic structural view of an antenna assembly provided in implementations of the disclosure.

Referring to FIG. 3, the antenna element 100 includes a first antenna element 10, a second antenna element 20, a third antenna element 30, and a reference ground 40. The first antenna element 10, the second antenna element 20, and the third antenna element 30 are arranged in sequence. The first antenna element 10, the second antenna element 20, and the third antenna element 30 are all electrically connected to the reference ground 40.

Figure 4:
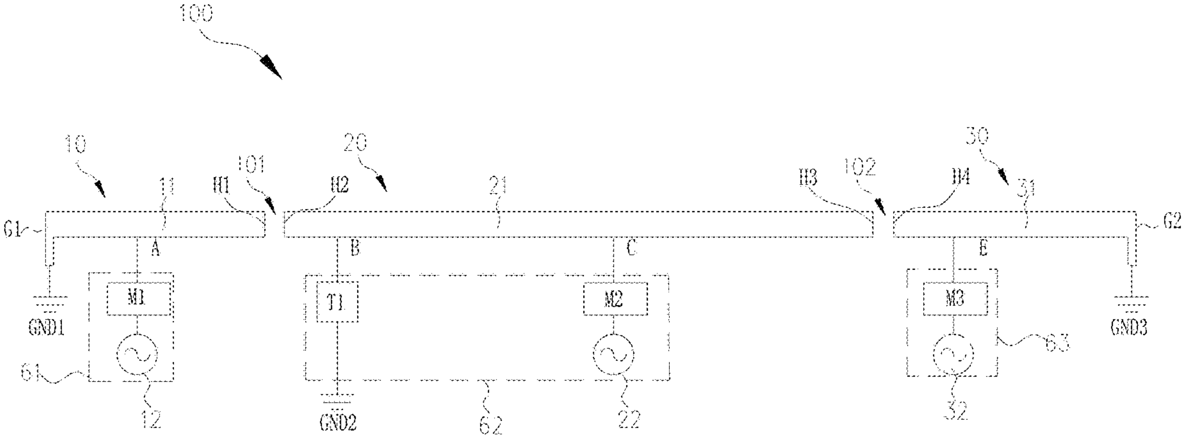
FIG. 4 is a schematic circuit diagram of a first type of antenna assembly in FIG. 3.

Referring to FIG. 3 and FIG. 4, the first antenna element 10 includes a first radiator 11 and a first RF front-end unit 61 electrically connected to the first radiator 11. The first RF front-end unit 61 is configured to feed a first RF signal into the first radiator 11, so that the first radiator 11 can transmit/receive a first electromagnetic wave signal.

Referring to FIG. 3 and FIG. 4, the second antenna element 20 includes a second radiator 21 and a second RF front-end unit 62 electrically connected to the second radiator 21. A first gap 101 is defined between one end of the second radiator 21 and one end of the first radiator 11. At least part of the second radiator 21 is configured to be coupled to the first radiator 11 through the first gap 101. A specific width of the first gap 101 is not limited herein, for example, the width of the first gap 101 is less than or equal to 2 mm, but is not limited to 2 mm. The second RF front-end unit 62 is configured to feed a second RF signal into the second radiator 21, so that the second radiator 21 can transmit/receive a second electromagnetic wave signal.

Referring to FIG. 3 and FIG. 4, the third antenna element 30 includes a third radiator 31 and a third RF front-end unit 63 electrically connected to the third radiator 31. The third RF front-end unit 63 is configured to feed a third RF signal into the third radiator 31, so that the third radiator 31 can transmit/receive a third electromagnetic wave signal. A second gap 102 is defined between the other end of the second radiator 21 and the third radiator 31. At least part of the third radiator 31 is configured to be coupled to the second radiator 21 through the second gap 102. A specific width of the second gap 102 is not limited herein, for example, the width of the second gap 102 is less than or equal to 2 mm, but is not limited to 2 mm. The third RF front-end unit 63 is configured to feed the third RF signal into the third radiator 31, so that the third radiator 31 can transmit/receive a third electromagnetic wave signal.

In the antenna assembly 100 formed by three antenna elements that are configured to be coupled to one another, the second electromagnetic wave signal transmitted/received by the second antenna element 20 under a coupling between the second radiator 21 and the third radiator 31 covers at least a global positioning system (GPS)-L1 band, a wireless fidelity (Wi-Fi) 2.4 GHz band, a long-term evolution middle-high band (LTE-MHB), and a new radio middle-high band (NR-MHB). In another implementation, the second electromagnetic wave signal transmitted/received by the second antenna element 20 under a coupling between the first radiator 11 and the second radiator 21 and the second electromagnetic wave signal transmitted/received by the second antenna element 20 under a coupling between the second radiator 21 and the third radiator 31 cover at least a global positioning system (GPS)-L1 band, a wireless fidelity (Wi-Fi) 2.4 GHz band, a long-term evolution middle-high band (LTE-MHB), and a new radio middle-high band (NR-MHB). Thus, in the disclosure, the second radiator 21 and the second RF front-end unit 62 of the second antenna element 20 are provided, and the third radiator 31 of the third antenna element 30 and the first radiator 11 of the first antenna element 10 are configured to be coupled to the second antenna element 20, so that the second antenna element 20 can cover various bands, such as the GPS-L1 band, the Wi-Fi 2.4 GHz band, the LTE-MHB, and the NR-MHB. In practice, the GPS-L1 band, the Wi-Fi 2.4 GHz band, the LTE-MHB, and the NR-MHB are all common antenna bands. In comparison, in the related art, multiple antenna modules are provided to cooperate with one another to cover the above-mentioned bands, for example, the GPS-L1 band and the Wi-Fi 2.4 GHz band are respectively covered by two different antenna modules or two different antenna elements. The antenna assembly 100 provided in the disclosure can cover the above-mentioned bands through one antenna element of one antenna assembly 100 (i.e., one antenna module), so that a structure of the antenna assembly 100 can be significantly simplified, a functional integration of the antenna assembly 100 can be improved, and the overall size of the antenna assembly 100 can be reduced, which is beneficial to improving the communication quality of the electronic device 1000 provided with the antenna assembly 100 and reducing the overall size of the electronic device 1000.

In the antenna assembly 100 provided in the implementations of the disclosure, the first radiator 11 of the first antenna element 10 is configured to be in capacitive coupling with the second radiator 21 of the second antenna element 20 through the first gap 101, and the second radiator 21 of the second antenna element 20 is configured to be in capacitive coupling with the third antenna element 30 and the third radiator 31 through the second gap 102, so that cooperative multiplexing of the first radiator 11 of the first antenna element 10, the second radiator 21 of the second antenna element 20, and the third radiator 31 of the third antenna element 30 can be achieved, and integration of three antenna elements can be realized. The electromagnetic waves transmitted/received by the second antenna element 20 in the integration of three antenna elements cover at least the GPS-L1 band, the Wi-Fi 2.4 GHz band, the LTE-MHB, and the NR-MHB, so that the antenna assembly 100 can transmit/receive a signal of a relatively wide bandwidth, and the communication quality of the antenna assembly 100 can be improved, in this case, not only a bandwidth of the antenna assembly 100 can be increased, but also the overall size of the antenna assembly 1000 can be reduced, thereby facilitating the overall miniaturization of the electronic device 1000.

In some implementations, in the antenna assembly 100 formed by the three antenna elements that are configured to be coupled to one another, the first electromagnetic wave signal transmitted/received by the first antenna element 10 covers at least the LTE-MHB, the NR-MHB, and a new radio ultra-high band (NR-UHB). In other words, in the disclosure, the first radiator 11 and the first RF front-end unit 61 of the first antenna element 10 are provided, and the second radiator 21 of the second antenna element 20 is configured to be coupled to the first antenna element 10, so that the first antenna element 10 can cover various bands, such as the LTE-MHB, the NR-MHB, and the NR-UHB. In practice, the LTE-MHB, the NR-MHB, and the NR-UHB are all common antenna bands. In comparison, in the related art, multiple antenna modules are provided to cooperate with one another to cover the above-mentioned bands. The antenna assembly 100 provided in the disclosure can cover the above-mentioned bands through one antenna element of one antenna assembly 100 (i.e., one antenna module), so that the structure of the antenna assembly 100 can be significantly simplified, the functional integration of the antenna assembly 100 can be improved, a stacking space can be reduced, and the overall size of the antenna assembly 100 can be reduced, which is beneficial to improving the communication quality of the electronic device 1000 provided with the antenna assembly 100 and reducing the overall size of the electronic device 1000.

In some implementations, in the antenna assembly 100 formed by the three antenna elements that are configured to be coupled to one another, the third electromagnetic wave signal transmitted/received by the third antenna element 30 covers at least the NR-UHB and the Wi-Fi 5 GHz band. In other words, in the disclosure, the third radiator 31 and the third RF front-end unit 63 of the third antenna element 30 are provided, and the second radiator 21 of the second antenna element 20 is configured to be coupled to the third antenna element 30, so that the third antenna element 30 can cover various bands, such as the NR-UHB and the Wi-Fi 5 GHz band. In practice, the NR-UHB and the Wi-Fi 5 GHz band are common antenna bands. In comparison, in the related art, multiple antenna modules are provided to cooperate with one another to cover the above-mentioned bands. The antenna assembly 100 provided in the disclosure can cover the above-mentioned bands through one antenna element of one antenna assembly 100 (i.e., one antenna module), so that the structure of the antenna assembly 100 can be significantly simplified, the functional integration of the antenna assembly 100 can be improved, the overall size of the antenna assembly 100 can be reduced, which is beneficial to improving the communication quality of the electronic device 1000 provided with the antenna assembly 100 and reducing the overall size of the electronic device 1000.

It can be seen from the above that, by designing the structures of the first antenna element 10, the second antenna element 20, and the third antenna element 30, and enabling the first antenna element 10 and the second antenna element 20 to be configured to be coupled with each other and the second antenna element 20 and the third antenna element 30 to be configured to be coupled with each other, the first electromagnetic wave signal transmitted/received by the first antenna element 10 can cover at least the LTE-MHB, the NR-MHB, and the NR-UHB band, the second electromagnetic wave signal transmitted/received by the second antenna element 20 can cover at least the GPS-L1 band, the Wi-Fi 2.4 GHz band, the LTE-MHB, and the NR-MHB, and the third electromagnetic wave signal transmitted/received by the third antenna element 30 can cover at least the NR-UHB band and the Wi-Fi 5 GHz band. In this way, three antenna elements are integrated in one antenna element or one antenna assembly 100 and one antenna element or one antenna assembly 100 can cover antenna signals of different bands, and thus the stacking space is saved, the overall volume of the antenna assembly 100 is reduced, and the overall size is reduced; the antenna assembly 100 can operate in multiple modes at the same time, thereby realizing ultra-wideband and improving the communication quality of the electronic device 1000 equipped with the antenna assembly 100.

Specific structures of the first antenna element 10, the second antenna element 20, and the third antenna element 30 will be illustrated below with reference to the accompanying drawings.

In the implementations, the first radiator 11 is in a strip shape. The first radiator 11 may be formed on the housing 500 or a carrier inside the housing 500 by means of coating, printing, or the like. The first radiator 11 extends along a trajectory which includes, but is not limited to, a straight line, a bending line, a curve, and the like. In the implementations, the first radiator 11 extends along a straight line. Along the trajectory, the first radiator 11 may be in a shape of a line with a uniform width, or a line with a varying width such as a line with gradually varying width or a line has a widened region.

Referring to FIG. 3 and FIG. 4, the first radiator 11 includes a first ground end G1, a first coupling end H1, and a first feeding point A disposed between the first ground end G1 and the first coupling end H1. The first ground end G1 is one distal end of the first radiator 11 and the first coupling end H1 is the other distal end of the first radiator 11.

The first ground end G1 is electrically connected to the reference ground 40. The reference ground 40 includes a first reference ground GND1. The first ground end G1 is electrically connected to the first reference ground GND1.

Referring to FIG. 4, the first RF front-end unit 61 includes at least a first signal source 12 and a first frequency-selection filter circuit M1.

Referring to FIG. 4, the first frequency-selection filter circuit M1 is disposed between the first feeding point A and the first signal source 12. Specifically, an output end of the first signal source 12 is electrically connected to an input end of the first frequency-selection filter circuit M1, and an output end of the first frequency-selection filter circuit M1 is electrically connected to the first feeding point A of the first radiator 11. The first signal source 12 is configured to generate an excitation signal (also referred to as an RF signal), and the first frequency-selection filter circuit M1 is configured to filter out a clutter in the excitation signal transmitted by the first signal source 12 to form the first RF signal, and transmit the first RF signal to the first radiator 11, enabling the first radiator 11 to transmit/receive the first electromagnetic wave signal.

Referring to FIG. 4, in the implementations, the second radiator 21 is in a strip shape. The second radiator 21 may be formed on the housing 500 or a carrier inside the housing 500 by means of coating, printing, or the like. The second radiator 21 extends along a trajectory which includes, but is not limited to, a straight line, a bending line, a curve, and the like. In the implementations, the second radiator 21 extends along a straight line. Along the trajectory, the second radiator 21 may be in a shape of a line with a uniform width, or a line with a varying width such as a line with gradually varying width or a line has a widened region.

Referring to FIG. 4, the second radiator 21 includes a second coupling end H2, a third coupling end H3 opposite the second coupling end H2, and a second feeding point C that is disposed between the second coupling end H2 and the third coupling end H3.

The second coupling end H2 and the first coupling end H1 are spaced apart from each other to define the first gap 101. In other words, the first gap 101 is defined between the second radiator 21 and the first radiator 11. The first radiator 11 is in capacitive coupling with the second radiator 21 through the first gap 101. The term "capacitive coupling" means that, when an electric field is generated between the first radiator 11 and the second radiator 21, a signal of the first radiator 11 can be transmitted to the second radiator 21 through the electric field, and a signal of the second radiator 21 can be transmitted to the first radiator 11 through the electric field, so that an electrical signal can be transmitted between the first radiator 11 and the second radiator 21 even in the case where the first radiator 11 is spaced apart from the second radiator 21.

Referring to FIG. 3 and FIG. 4, the second RF front-end unit 62 includes a second signal source 22 and a second frequency-selection filter circuit M2. The reference ground 40 further includes a second reference ground GND2. The second reference ground GND2 and the first reference ground GND1 can be the same reference ground or different reference grounds.

Referring to FIG. 4, the second frequency-selection filter circuit M2 is disposed between the second feeding point C and the second signal source 22. Specifically, the second signal source 22 is electrically connected to an input end of the second frequency-selection filter circuit M2, and an output end of the second frequency-selection filter circuit M2 is electrically connected to the second radiator 21. The second signal source 22 is configured to generate an excitation signal (also referred to as an RF signal). The second frequency-selection filter circuit M2 is configured to filter out a clutter in the excitation signal transmitted by the second signal source 22 to form the second RF signal, and transmit the second RF signal to the second radiator 21, enabling the second radiator 21 to transmit/receive the second electromagnetic wave signal.

In the implementations, the third radiator 31 is in a strip shape. The third radiator 31 may be formed on the housing 500 or a carrier inside the housing 500 by means of coating, printing, or the like. The third radiator 31 extends along a trajectory which includes, but is not limited to, a straight line, a bending line, a curve, and the like. In the implementations, the third radiator 31 extends along a straight line. Along the trajectory, the third radiator 31 may be in a shape of a line with a uniform width, or a line with a varying width such as a line with gradually varying width or a line has a widened region.

Referring to FIG. 4, the third radiator 31 includes a fourth coupling end H4, a second ground end G2, and a third feeding point E disposed between the fourth coupling end H4 and the second ground end G2. The fourth coupling end H4 is one distal end of the third radiator 31 and the second ground end G2 is the other distal end of the third radiator 31. The second gap 102 is defined between the fourth coupling end H4 and the third coupling end H3.

Referring to FIG. 4, the third RF front-end unit 63 includes a third signal source 32 and a third frequency-selection filter circuit M3.

One end of the third frequency-selection filter circuit M3 is electrically connected to the third feeding point E, and the other end of the third frequency-selection filter circuit M3 is electrically connected to the third signal source 32. The third frequency-selection filter circuit M3 is configured to filter out a clutter in an RF signal transmitted by the third signal source 32 to form the third RF signal, and transmit the third RF signal to the third radiator 31, enabling the third radiator 31 to be excited to transmit/receive the third electromagnetic wave signal.

Referring to FIG. 3 and FIG. 4, the reference ground 40 further includes a third reference ground GND3. Both the third frequency-selection filter circuit M3 and the second ground end G2 are electrically connected to the third reference ground GND3. Alternatively, the third reference ground GND3, the second reference ground GND2, and the first reference ground GND1 may be integrated with or separated from one another.

A specific forming manner of the first radiator 11, the second radiator 21, and the third radiator 31 is not limited herein. Each of the first radiator 11, the second radiator 21, and the third radiator 31 includes, but is not limited to, at least one of a flexible printed circuit (FPC) antenna radiator, a laser direct structuring (LDS) antenna radiator, a print direct structuring (PDS) antenna radiator, and the like.

Specifically, each of the first radiator 11, the second radiator 21, and the third radiator 31 is made of a conductive material, which includes, but is not limited to, metal, transparent conductive oxide (for example, indium tin oxide (ITO)), carbon nanotube, graphene, and the like. In the implementations, each of the first radiator 11, the second radiator 21, and the third radiator 31 is made of a metal material, for example, silver or copper.

In some implementations, in the case where the antenna assembly 100 is applied to the electronic device 1000, the first signal source 12, the second signal source 22, the third signal source 32, the first frequency-selection filter circuit M1, the second frequency-selection filter circuit M2, and the third frequency-selection filter circuit M3 are all disposed at the main printed circuit board 200 of the electronic device 1000.

In some implementations, the first signal source 12, the second signal source 22, and the third signal source 32 may be the same signal source. Alternatively, the third signal source 32, the first signal source 12, and the second signal source 22 may be different from each other.

Specifically, the first signal source 12, the second signal source 22, and the third signal source 32 may be the same signal source, which is configured to transmit an excitation signal to the first frequency-selection filter circuit M1, the second frequency-selection filter circuit M2, and the third frequency-selection filter circuit M3, respectively. Due to different circuit structures of the first frequency-selection filter circuit M1, the second frequency-selection filter circuit M2, and the third frequency-selection filter circuit M3, the first frequency-selection filter circuit M1, the second frequency-selection filter circuit M2, and the third frequency-selection filter circuit M3 have different gate bands. As a result, the first radiator 11, the second radiator 21, and the third radiator 31 can be excited by different excitation signals, respectively, so that the first radiator 11 can transmit/receive the first electromagnetic wave signal, the second radiator 21 can transmit/receive the second electromagnetic wave signal, and the third radiator 31 can transmit/receive the third electromagnetic wave signal, where the first electromagnetic wave signal, the second electromagnetic wave signal, and the third electromagnetic wave signal are different in band, and thus the antenna assembly 100 can cover a relatively wide band, and a relatively high signal transmission/reception isolation and a small interference between each two antenna elements can be achieved.

In another implementation, the first signal source 12, the second signal source 22, and the third signal source 32 are different signal sources. The first signal source 12, the second signal source 22, and the third signal source 32 may be integrated in the same chip or separately packaged in different chips. The first signal source 12 is configured to generate a first excitation signal. The first excitation signal is filtered by the first frequency-selection filter circuit M1 to form the first RF signal. The first RF signal is loaded to the first radiator 11, so that the first radiator 11 can transmit/receive the first electromagnetic wave signal. The second signal source 22 is configured to generate a second excitation signal. The second excitation signal is filtered by the second frequency-selection filter circuit M2 to form the second RF signal. The second RF signal is loaded to the second radiator 21, so that the second radiator 21 can transmit/receive the second electromagnetic wave signal. The third signal source 32 is configured to generate a third excitation signal. The third excitation signal is filtered by the third frequency-selection filter circuit M3 to form the third RF signal. The third RF signal is loaded to the third radiator 31, so that the third radiator 31 can transmit/receive the third electromagnetic wave signal.

In the implementations, the first frequency-selection filter circuit M1, the second frequency-selection filter circuit M2, and the third frequency-selection filter circuit M3 are arranged in a way that allows the first antenna element 10, the second antenna element 20, and the third antenna element 30 to transmit/receive electromagnetic wave signals of different bands, thereby improving isolation among the first antenna element 10, the second antenna element 20 and the third antenna element 30. In other words, the first frequency-selection filter circuit M1, the second frequency-selection filter circuit M2, and the third frequency-selection filter circuit M3 may also minimize or eliminate interference among the electromagnetic wave signal transmitted/received by the first antenna element 10, the electromagnetic wave signal transmitted/received by the second antenna element 20, and the electromagnetic wave signal transmitted/received by the third antenna element 30.

It can be understood that, the first frequency-selection filter circuit M1 includes, but is not limited to, a capacitor(s), an inductor(s), and a resistor(s) that are connected in series and/or in parallel. The first frequency-selection filter circuit M1 may include multiple branches formed by a capacitor(s), an inductor(s), and a resistor(s) that are connected in series and/or in parallel, and switches that control connection/disconnection of the multiple branches. By controlling on/off of different switches, FT parameters (including a resistance value, an inductance value, and a capacitance value) of the first frequency-selection filter circuit M1 can be adjusted, and thus a filtering range of the first frequency-selection filter circuit M1 can be adjusted, and consequently, the first frequency-selection filter circuit M1 can extract the first RF signal from the excitation signal transmitted by the first signal source 12, enabling the first antenna element 10 to transmit/receive the first electromagnetic wave signal. Similarly, the second frequency-selection filter circuit M2 may include multiple branches formed by a capacitor(s), an inductor(s), and a resistor(s) that are connected in series and/or in parallel, and switches that control connection/disconnection of the multiple branches. The third frequency-selection filter circuit M3 may include multiple branches formed by a capacitor(s), an inductor(s), and a resistor(s) that are connected in series and/or in parallel, and switches that control connection/disconnection of the multiple branches. The third frequency-selection filter circuit M3 is grounded through a fourth reference ground GND4. The first frequency-selection filter circuit M1, the second frequency-selection filter circuit M2, and the third frequency-selection filter circuit M3 are different from one another in specific structure. The first frequency-selection filter circuit M1 is configured to perform impedance adjustment on the first radiator 11 electrically connected to the first frequency-selection filter circuit M1, the second frequency-selection filter circuit M2 is configured to perform impedance adjustment on the second radiator 21 electrically connected to the second frequency-selection filter circuit M2, and the third frequency-selection filter circuit M3 is configured to perform impedance adjustment on the third radiator 31 electrically connected to the third frequency-selection filter circuit M3, so that an impedance of the first radiator 11 can match a resonant frequency of the first radiator 11, an impedance of the second radiator 21 can match a resonant frequency of the second radiator 21, and an impedance of the third radiator 31 can match a resonant frequency of the third radiator 31, realizing a relatively large signal transmission/reception efficiency of each of the first radiator 11, the second radiator 21, and the third radiator 31. Therefore, the first frequency-selection filter circuit M1, the second frequency-selection filter circuit M2, and the third frequency-selection filter circuit M3 may also be referred to as matching circuits.

Referring to FIGS. 5 to 12 together, FIGS. 5 to 12 are schematic diagrams of the first frequency-selection filter circuit M1 provided in various implementations, respectively. The first frequency-selection filter circuit M1 includes one or more of the following circuits.

Figure 5:
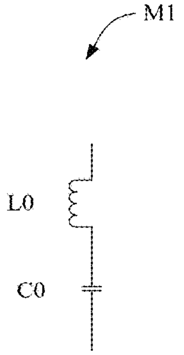
FIG. 5 is a schematic structural diagram of a first type of first frequency-selection filter circuit provided in implementations of the disclosure.

Referring to FIG. 5, the first frequency-selection filter circuit M1 includes a band-pass circuit formed by an inductor L0 and a capacitor C0 connected in series.

Figure 6:
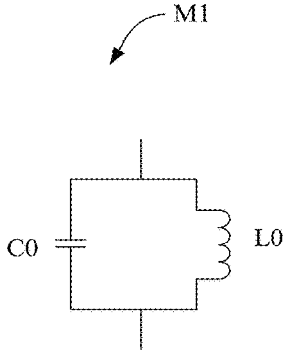
FIG. 6 is a schematic structural diagram of a second type of first frequency-selection filter circuit provided in implementations of the disclosure.

Referring to FIG. 6, the first frequency-selection filter circuit M1 includes a band-stop circuit formed by an inductor L0 and a capacitor C0 connected in parallel.

Figure 7:
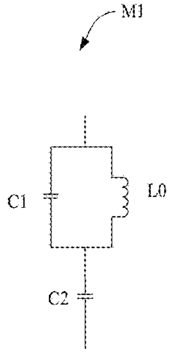
FIG. 7 is a schematic structural diagram of a third type of first frequency-selection filter circuit provided in implementations of the disclosure.

Referring to FIG. 7, the first frequency-selection filter circuit M1 includes an inductor L0, a first capacitor C1, and a second capacitor C2. The inductor L0 is connected in parallel to the first capacitor C1, and the second capacitor C2 is electrically connected to a node where the inductor L0 is electrically connected to the first capacitor C1.

Figure 8:
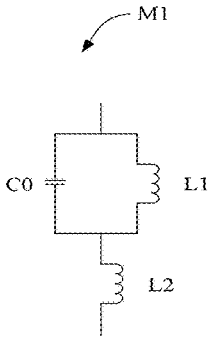
FIG. 8 is a schematic structural diagram of a fourth type of first frequency-selection filter circuit provided in implementations of the disclosure.

Referring to FIG. 8, the first frequency-selection filter circuit M1 includes a capacitor C0, a first inductor L1, and a second inductor L2. The capacitor C0 is connected in parallel to the first inductor L1, and the second inductor L2 is electrically connected to a node where the capacitor C0 is electrically connected to the first inductor L1.

Figure 9:
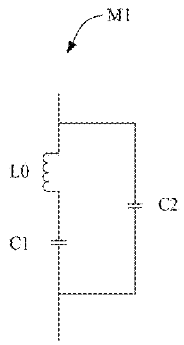
FIG. 9 is a schematic structural diagram of a fifth type of first frequency-selection filter circuit provided in implementations of the disclosure.

Referring to FIG. 9, the first frequency-selection filter circuit M1 includes an inductor L0, a first capacitor C1, and a second capacitor C2. The inductor L0 is connected in series to the first capacitor C1, one end of the second capacitor C2 is electrically connected to one end of the inductor L0 that is not connected to the first capacitor C1, and the other end of the second capacitor C2 is electrically connected to one end of the first capacitor C1 that is not connected to the inductor L0.

Figure 10:
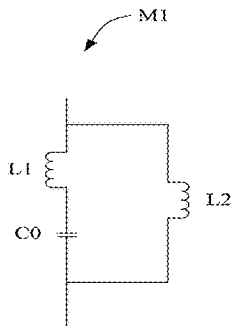
FIG. 10 is a schematic structural diagram of a sixth type of first frequency-selection filter circuit provided in implementations of the disclosure.

Referring to FIG. 10, the first frequency-selection filter circuit M1 includes a capacitor C0, a first inductor L1, and a second inductor L2. The capacitor C0 is connected in series to the first inductor L1, one end of the second inductor L2 is electrically connected to one end of the capacitor C0 that is not connected to the first inductor L1, and the other end of the second inductor L2 is electrically connected to one end of the first inductor L1 that is not connected to the capacitor C0.

Figure 11:
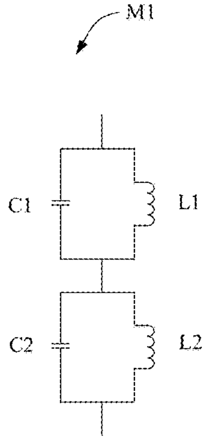
FIG. 11 is a schematic structural diagram of a seventh type of first frequency-selection filter circuit provided in implementations of the disclosure.

Referring to FIG. 11, the first frequency-selection filter circuit M1 includes a first capacitor C1, a second capacitor C2, a first inductor L1, and a second inductor L2. The first capacitor C1 is connected in parallel to the first inductor L1, the second capacitor C2 is connected in parallel to the second inductor L2, and one end of a circuit formed by the second capacitor C2 and the second inductor L2 connected in parallel is electrically connected to one end of a circuit formed by the first capacitor C1 and the first inductor L1 connected in parallel.

Figure 12:
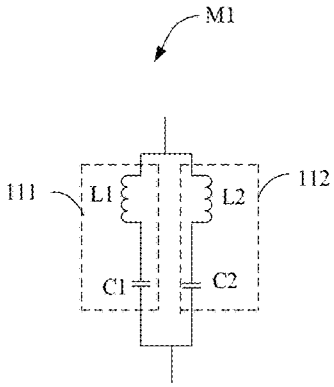
FIG. 12 is a schematic structural diagram of an eighth type of first frequency-selection filter circuit provided in implementations of the disclosure.

Referring to FIG. 12, the first frequency-selection filter circuit M1 includes a first capacitor C1, a second capacitor C2, a first inductor L1, and a second inductor L2. The first capacitor C1 and the first inductor L1 are connected in series to form a first unit 111, the second capacitor C2 and the second inductor L2 are connected in series to form a second unit 112, and the first unit 111 and the second unit 112 are connected in parallel.

It can be understood that, in the disclosure, the second frequency-selection filter circuit M2 may include one or more circuits illustrated in FIGS. 5 to 12. The third frequency-selection filter circuit M3 may include one or more circuits illustrated in FIGS. 5 to 12.

The first frequency-selection filter circuit M1 has different band-pass and band-stop characteristics for different bands.

It can be seen from the above that, by setting a frequency-tuning (FT) circuit and adjusting parameters of the FT circuit, a resonant frequency of the first antenna element 10, a resonant frequency of the second antenna element 20, and a resonant frequency of the third antenna element 30 can shift towards LB or HB, and thus an ultra-wideband of the antenna assembly 100 can be achieved and the antenna assembly 100 can cover bands of GPS, Wi-Fi, 4G, 5G, and even more bands, widening a coverage of an antenna signal of the antenna assembly 100 and improving communication quality of the antenna assembly 100.

A FT manner provided in the disclosure will be illustrated below with reference to the accompanying drawings, and with the FT manner, a suitable impedance matching can be achieved and a radiation efficiency of the antenna assembly 100 can be increased. In some implementations, the FT manner for antenna elements provided in the disclosure includes, but is not limited to, an aperture FT and a matching FT. In the disclosure, by setting the FT circuit, a resonant frequency of the antenna element can shift towards LB or HB, so that the antenna element can transmit/receive an electromagnetic wave of a desired band.

Referring to FIG. 4, the second radiator 21 further includes a coupling point B disposed at one side of the second coupling end H2 away from the first coupling end H1. The second antenna element 20 further includes a first FT circuit T1. One end of the first FT circuit T1 is electrically connected to the coupling point B. The other end of the first FT circuit T1 is grounded. In the implementations, the first FT circuit T1 is directly electrically connected to the second radiator 21 to adjust impedance matching characteristics of the second radiator 21 to achieve aperture adjustment. In other implementations, the first FT circuit T1 may also be electrically connected to the second frequency-selection filter circuit M2, and the first FT circuit T1 and the second frequency-selection filter circuit M2 cooperate to form a matching circuit to adjust the impedance matching characteristics of the second radiator 21 to achieve matching adjustment.

In some implementations, the first FT circuit T1 includes a combination of a switch and at least one of a capacitor or an inductor; and/or the first FT circuit T1 includes a variable capacitor.

In an implementation, the first FT circuit T1 includes, but is not limited to, a capacitor(s), an inductor(s), and a resistor(s) that are connected in series and/or in parallel. The first FT circuit T1 may include multiple branches formed by a capacitor(s), an inductor(s), and a resistor(s) that are connected in series and/or in parallel, and switches that control connection/disconnection of the multiple branches. By controlling on/off of different switches, the FT parameters (including the resistance value, the inductance value, and the capacitance value) of the first FT circuit T1 can be adjusted, thereby adjusting the impedance of the second radiator 21, and further adjusting the resonant frequency of the second radiator 21. A specific structure of the first FT circuit T1 is not limited herein. For example, the first FT circuit T1 may include one or more circuits illustrated in FIGS. 5 to 12.

In another implementation, the first FT circuit T1 includes, but is not limited to, a variable capacitor. FT parameters of the first FT circuit T1 can be adjusted by adjusting a capacitance value of the variable capacitor, thereby adjusting the impedance of the second radiator 21, and further adjusting the resonant frequency of the second radiator 21.

The impedance of the second radiator 21 can be adjusted by setting the first FT circuit T1 and adjusting the FT parameters (for example, the resistance value, the capacitance value, and the inductance value) of the first FT circuit T1, so that the resonant frequency of the second radiator 21 can shift towards high band (HB) or low band (LB) by a small range. In this way, the second antenna element 20 can cover a relatively wide band.

Figure 13:
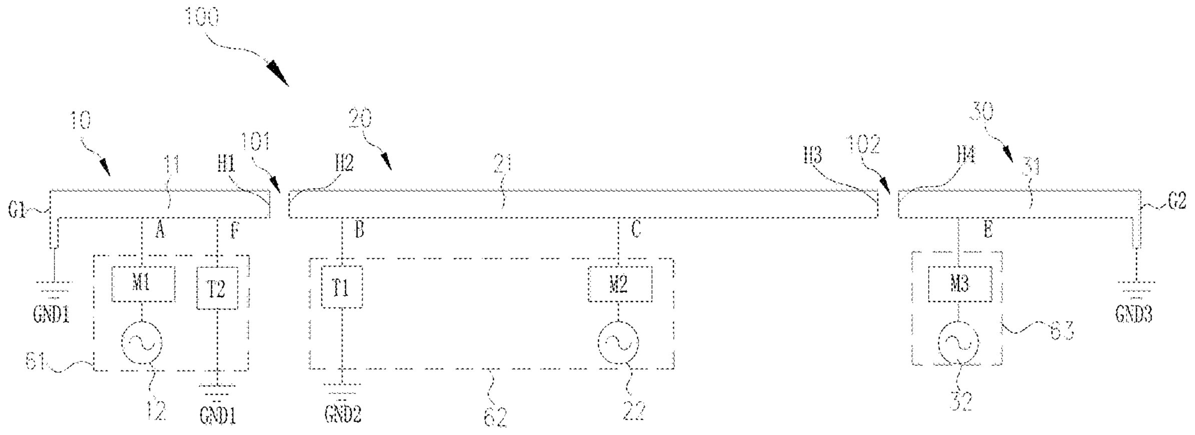
FIG. 13 is a schematic circuit diagram of a second type of antenna assembly in FIG. 3.
Figure 14:
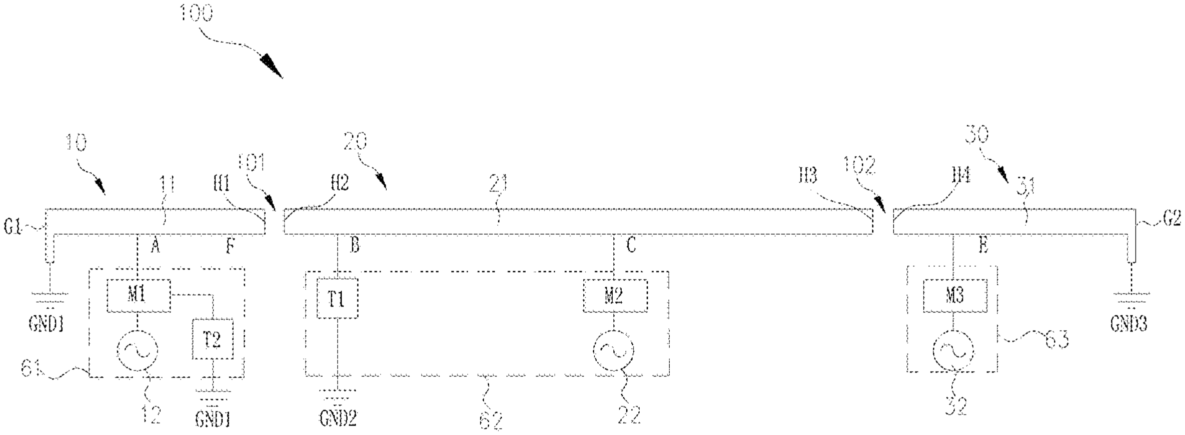
FIG. 14 is a schematic circuit diagram of a third type of antenna assembly in FIG. 3.

Further, referring to FIG. 13 and FIG. 14, the first antenna element 10 further includes a second FT circuit T2, and the first radiator 11 further includes a FT point F. The FT point F is disposed between the first feeding point A and the first coupling end H1. One end of the second FT circuit T2 is electrically connected to the FT point F or the first frequency-selection filter circuit M1. The other end of the second FT circuit T2 is grounded.

In the implementations, referring to FIG. 13, the second FT circuit T2 is directly electrically connected to the first radiator 11 to adjust impedance matching characteristics of the first radiator 11, thereby achieving aperture adjustment. In other implementations, referring to FIG. 14, the second FT circuit T2 may also be electrically connected to the first frequency-selection filter circuit M1, and the second FT circuit T2 and the first frequency-selection filter circuit M1 cooperate to form a matching circuit to adjust the impedance matching characteristics of the first radiator 11, thereby achieving matching adjustment.

In some implementations, the second FT circuit T2 includes a combination of a switch and at least one of a capacitor and an inductor; and/or the second FT circuit T2 includes a variable capacitor.

In an implementation, the second FT circuit T2 includes, but is not limited to, a capacitor(s), an inductor(s), and a resistor(s) that are connected in series and/or in parallel. The second FT circuit T2 may include multiple branches formed by a capacitor(s), an inductor(s), and a resistor(s) that are connected in series and/or in parallel, and switches that control connection/disconnection of the multiple branches. By controlling on/off of different switches, FT parameters (including a resistance value, an inductance value, and a capacitance value) of the second FT circuit T2 can be adjusted, thereby adjusting the impedance of the first radiator 11, and further adjusting the resonant frequency of the first radiator 11. A specific structure of the second FT circuit T2 is not limited herein. For example, the second FT circuit T2 may include one or more circuits illustrated in FIGS. 5 to 12.

In another implementation, the second FT circuit T2 includes, but is not limited to, a variable capacitor. The FT parameters of the second FT circuit T2 can be adjusted by adjusting a capacitance value of the variable capacitor, thereby adjusting the impedance of the first radiator 11, and further adjusting the resonant frequency of the first radiator 11.

The impedance of the first radiator 11 can be adjusted by setting the second FT circuit T2 and adjusting the FT parameters (for example, the resistance value, the capacitance value, and the inductance value) of the second FT circuit T2, so that the resonant frequency of the first radiator 11 can shift towards HB or LB by a small range. In this way, the first antenna element 10 can cover a relatively wide band.

An equivalent circuit diagram and a resonant mode of the first antenna element 10 in the disclosure will be illustrated below with reference to the accompanying drawings.

Figure 15:
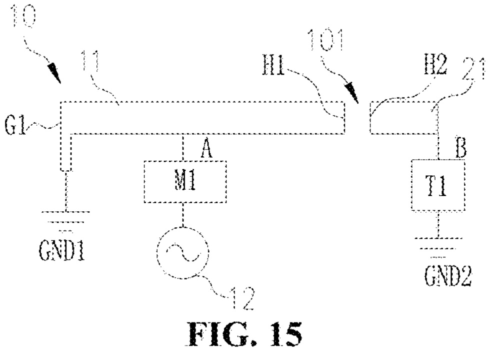
FIG. 15 is an equivalent circuit diagram of a first antenna element in FIG. 4.
Figure 16:
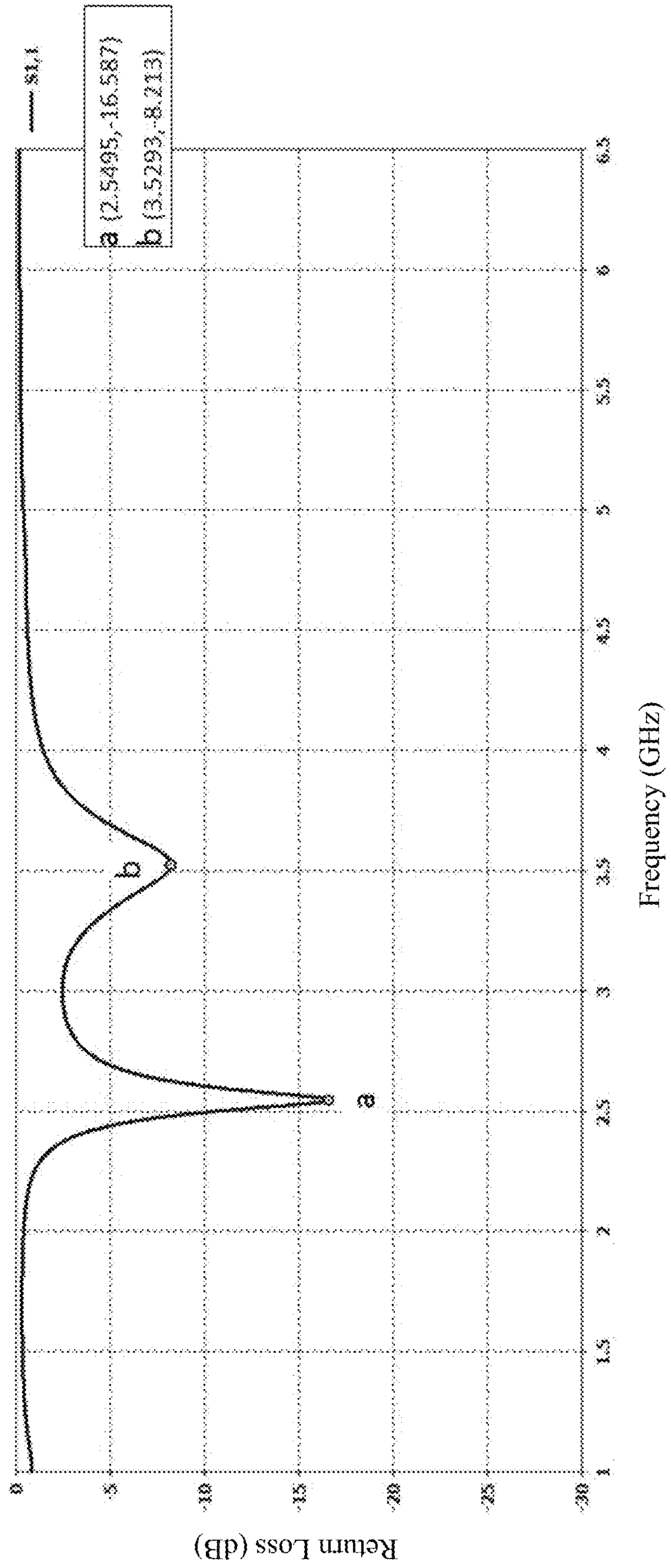
FIG. 16 is a return loss curve diagram of serval resonant modes of the first antenna element in FIG. 4.

Referring to FIG. 15, FIG. 15 is an equivalent circuit diagram of the first antenna element 10. Part of the second antenna element 20 is in capacitive coupling with the first antenna element 10. Referring to FIG. 16, FIG. 16 is a return loss curve diagram of the first antenna element 10.

In the disclosure, by designing a quantity and structure of antenna elements of the antenna assembly 100, and designing an effective electrical length and structure of the first radiator 11 of the first antenna element 10, a position of the first feeding point A, an effective electrical length of the coupling between the second radiator 21 and the first radiator 11, and the like, a resonant mode of a band with high practicability can be formed, thereby allowing electromagnetic wave transmission/reception of the band with high practicability. Further, an impedance matching of the first radiator 11 is adjusted by FT circuits (including the first FT circuit T1 and the second FT circuit T2), so that a shift towards HB or LB can be achieved in the resonant mode of the first antenna element 10, enabling the first antenna element 10 to have an ultra-bandwidth of the band with high practicability. The effective electrical length refers to a length of the first radiator 11 on which the first RF signal acts. The effective electrical length may be an actual length of the first radiator 11, and may also be slightly shorter or longer than the actual length of the first radiator 11.

As illustrated in FIG. 16, by designing the effective electrical length of the first radiator 11, part of the first radiator 11 between the first ground end G1 and the first coupling end H1 is configured to generate a first resonant mode a under excitation of an RF signal transmitted by the first signal source 12. In some implementations, by designing the effective electrical length of the first radiator 11, part of the first radiator 11 between the first ground end G1 and the first coupling end H1 is configured to resonate in the first resonant mode a under excitation of the RF signal transmitted by the first signal source 12. By designing the position of the first feeding point A, part of the first radiator 11 between the first feeding point A and the first coupling end H1 is configured to generate a second resonant mode b under excitation of the RF signal transmitted by the first signal source 12. In some implementations, by designing the position of the first feeding point A, part of the first radiator 11 between the first feeding point A and the first coupling end H1 is configured to resonate in the second resonant mode b under excitation of the RF signal transmitted by the first signal source 12. A combination of a band of the first resonant mode a and a band of the second resonant mode b ranges from 2 GHz to 4 GHz.

Further, the first resonant mode a is a ¼ wavelength fundamental mode in which part of the first antenna element 10 between the first ground end G1 and the first coupling end H1 operates. It can be understood that the ¼ wavelength fundamental mode is a high-efficiency resonant mode in which the first RF signal excites part of the first antenna element 10 between the first ground end G1 and the first coupling end H1. The first antenna element 10 has high transmission/reception efficiency when operating in the fundamental mode. In other words, in a band covered by the first resonant mode a, high transmission/reception efficiency can be achieved. The band covered by the first resonant mode a includes, but is not limited to, a B40 band, a B41 band, and an N41 band.

In an implementation, by designing an effective electrical length of the first radiator 11 between the first ground end G1 and the first coupling end H1, and for example, by designing a length of the first radiator 11 between the first ground end G1 and the first coupling end H1 to be about 2.9 cm, part of the first radiator 11 between the first ground end G1 and the first coupling end H1 can radiate in the first resonant mode a (i.e., the ¼ wavelength fundamental mode) by adjusting parameters of the first FT circuit T1 and the first frequency-selection filter circuit M1. For example, referring to FIG. 16, a resonant frequency of the first resonant mode a is about 2.5495 GHz.

Further, referring to FIG. 16, the second resonant mode b is a ¼ wavelength fundamental mode in which part of the first antenna element 10 between the first feeding point A and the first coupling end H1 operates. The first antenna element 10 has high transmission/reception efficiency when operating in the second resonant mode b. In other words, in a band covered by the second resonant mode b, high transmission/reception efficiency can be achieved. The band covered by the second resonant mode b includes, but is not limited to, an N77 band and an N78 band.

In an implementation, by designing an effective electrical length of the first radiator 11 between the first feeding point A and the first coupling end H1, and for example, by designing a length between the first feeding point A and the first coupling end H1 to be about 2.1 cm, part of the first radiator 11 between the first feeding point A and the first coupling end H1 can radiate in the second resonant mode b (i.e., the ¼ wavelength fundamental mode) by adjusting the parameters of the first FT circuit T1 and the first frequency-selection filter circuit M1. For example, referring to FIG. 16, a resonant frequency of the second resonant mode b is about 3.5293 GHz.

In the implementations of the disclosure, by designing a size and structure of the first radiator 11, designing the position of the first feeding point A, and adjusting the parameters of the first FT circuit T1, the first radiator 11 can cover a certain band ranging from 2 GHz to 4 GHz, thereby covering the B40 band, the B41 band, the N41 band, the N77 band, and the N78 band, and achieving high transmission/reception efficiency in the B40 band, the B41 band, the N41 band, the N77 band, and the N78 band.

It can be understood that part of the second radiator 21 between the coupling point B and the second coupling end H2 is configured to be in capacitive coupling with the first radiator 11. Specifically, a length of the second radiator 21 between the coupling point B and the second coupling end H2 is less than ¼ of a wavelength of the electromagnetic wave of a resonant frequency of the second resonant mode b. The length of the second radiator 21 between the coupling point B and the second coupling end H2 is less than 2.1 cm. The second antenna element 20 has a capacitive loading function on the first antenna element 10, so that the electromagnetic wave signal radiated by the first antenna element 10 can shift towards an LB, and the radiation efficiency of the first antenna element 10 can also be improved.

An equivalent circuit diagram and a resonant mode of the second antenna element 20 in the disclosure are illustrated below with reference to the accompanying drawings.

Figure 17:
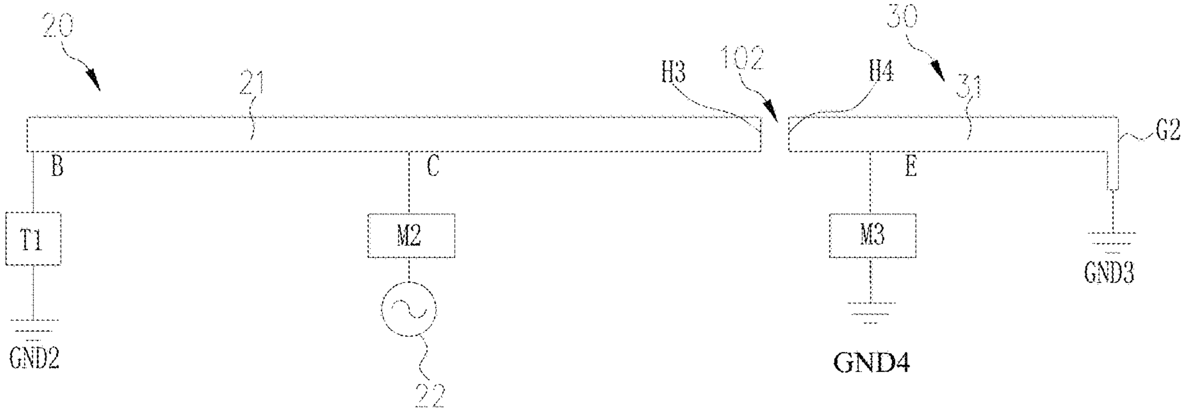
FIG. 17 is an equivalent circuit diagram of a second antenna element in FIG. 4.
Figure 18:
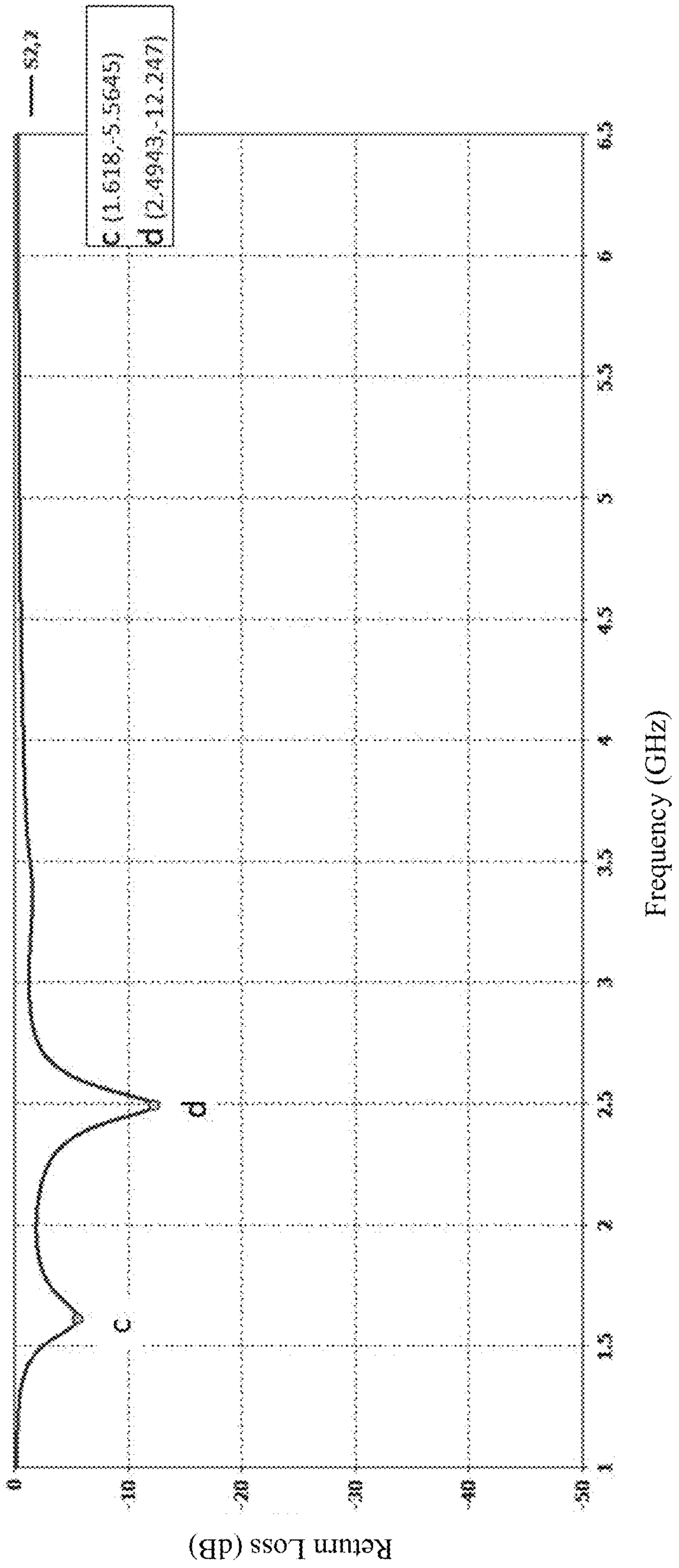
FIG. 18 is a return loss curve diagram of serval resonant modes of the second antenna element in FIG. 4.

Referring to FIG. 17, FIG. 17 is an equivalent circuit diagram of the second antenna element 20. The third antenna element 30 is configured to be in capacitive coupling with the second antenna element 20. Referring to FIG. 18, FIG. 18 is a return loss curve diagram of the second antenna element 20.

It can be understood that, in the disclosure, by designing a quantity and structure of the antenna elements of the antenna assembly 100, and designing an effective electrical length and structure of the second radiator 21 of the second antenna element 20, a position of the second feeding point C, an effective electrical coupling length between the third radiator 31 and the second radiator 21, and the like, a resonant mode of a band with high practicability can be formed, thereby allowing electromagnetic wave transmission/reception of the band with high practicability. Further, an impedance matching of the second radiator 21 is adjusted by FT circuits (including the second FT circuit T2, the second frequency-selection filter circuit M2, and the third frequency-selection filter circuit M3), so that a shift towards HB or LB can be achieved in the resonant mode of the second antenna element 20, enabling the second antenna element 20 to have an ultra-bandwidth of the band with high practicability. The effective electrical length refers to a length of the second radiator 21 on which the second RF signal acts. The effective electrical length may be an actual length of the second radiator 21, and may also be slightly shorter or longer than the actual length of the second radiator 21.

As illustrated in FIG. 18, by designing the effective electrical length of the second radiator 21, part of the second radiator 21 between the coupling point B and the third coupling end H3 is configured to generate a third resonant mode c under excitation of an RF signal transmitted by the second signal source 12. In some implementations, by designing the effective electrical length of the second radiator 21, part of the second radiator 21 between the coupling point B and the third coupling end H3 is configured to resonate in the third resonant mode c under excitation of the RF signal transmitted by the second signal source 12. By designing the position of the second feeding point C, the third radiator 31 and part of the second radiator 21 between the second feeding point C and the third coupling end H3 are configured to corporately generate a fourth resonant mode d under excitation of the RF signal transmitted by the second signal source 22. In some implementations, by designing the position of the second feeding point C, the third radiator 31 and part of the second radiator 21 between the second feeding point C and the third coupling end H3 are configured to resonate in the fourth resonant mode d under excitation of the RF signal transmitted by the second signal source 22. A combination of a band of the third resonant mode c and a band of the fourth resonant mode d ranges from 1.5 GHz to 3 GHz. In the implementations, the second excitation signal generated by the second signal source 22 can be coupled to the third radiator 31 to make the third radiator 31 resonate, and thus the third radiator 31 and part of the second radiator 21 between the second feeding point C and the third coupling end H3 cooperate to operate in the fourth resonant mode d. It is noted that, in the fourth resonant mode d, radiation strength of the third radiator 31 is significantly greater than radiation strength of part of the second radiator 21 between the second feeding point C and the third coupling end H3, so that the fourth resonant mode d is primarily generated by the third radiator 31, and a large current will generate in the third radiator 21 and flow to the ground through the third reference ground GND3. The large current generated in the third radiator 21 is a resonant current. Since the fourth resonant mode d is primarily generated by the third radiator 31, an isolation among bands corresponding to different resonances is further improved.

Further, the third resonant mode c is a ¼ wavelength fundamental mode in which part of the second antenna element 20 between the coupling point B and the third coupling end H3 operates. The second antenna element 20 has high transmission/reception efficiency when operating in the fundamental mode. In other words, in a band covered by the third resonant mode c, high transmission/reception efficiency can be achieved. The band covered by the third resonant mode c includes, but is not limited to, GPS-L1 band, a B3 band, and the N3 band.

In an implementation, by designing an effective electrical length of the second radiator 21 between the coupling point B and the third coupling end H3, and for example, by designing a length of the second radiator 21 between the coupling point B and the third coupling end H3 to be about 4.6 cm, part of the second radiator 21 between the coupling point B and the third coupling end H3 can radiate in the third resonant mode c (i.e., the ¼ wavelength fundamental mode) by adjusting parameters of the second FT circuit T2, the second frequency-selection filter circuit M2, and the third frequency-selection filter circuit M3. For example, referring to FIG. 18, a resonant frequency of the third resonant mode c is about 1.618 GHz.

Further, the fourth resonant mode d is a ¼ wavelength fundamental mode in which the third radiator 31 and part of the second antenna element 20 between the second feeding point C and the third coupling end H3 operate. Each of the second antenna element 20 and the third antenna element 30 has high transmission/reception efficiency when operating in the fourth resonant mode d. In other words, in a band covered by the fourth resonant mode d, high transmission/reception efficiency can be achieved. The band covered by the fourth resonant mode d includes, but is not limited to, Wi-Fi 2.4 GHz band, a B7 band, the B40 band, the B41 band, the N7 band, and the N41 band.

In an implementation, by designing an effective electrical length of the second radiator 21 between the second feeding point C and the third coupling end H3, and for example, by designing a length of the second radiator 21 between the second feeding point C and the third coupling end H3 to be about 2.1 cm, the third radiator 31 and part of the second radiator 21 between the second feeding point C and the third coupling end H3 can radiate in the fourth resonant mode d (i.e., the ¼ wavelength fundamental mode) by adjusting parameters of the first FT circuit T1, the second frequency-selection filter circuit M2, and the third frequency-selection filter circuit M3. For example, referring to FIG. 18, a resonant frequency of the fourth resonant mode d is about 2.4943 GHz.

In the implementations of the disclosure, by designing a size and structure of the second radiator 21, designing the position of the second feeding point C, and adjusting the parameters of the first FT circuit T1, the second frequency-selection filter circuit M2, and the third frequency-selection filter circuit M3, the second radiator 21 can cover a certain band ranging from 1.5 GHz to 3 GHz, thereby covering GPS-L1 band, Wi-Fi 2.4 GHz band, the B3 band, the B7 band, the B40 band, the B41 band, the N3 band, the N7 band, and the N41 band, and achieving high transmission/reception efficiency in GPS-L1 band, Wi-Fi 2.4 GHz band, the B3 band, the B7 band, the B40 band, the B41 band, the N3 band, the N7 band, and the N41 band.

An equivalent circuit diagram and a resonant mode of the third antenna element 30 in the disclosure are illustrated below with reference to the accompanying drawings.

Figure 19:
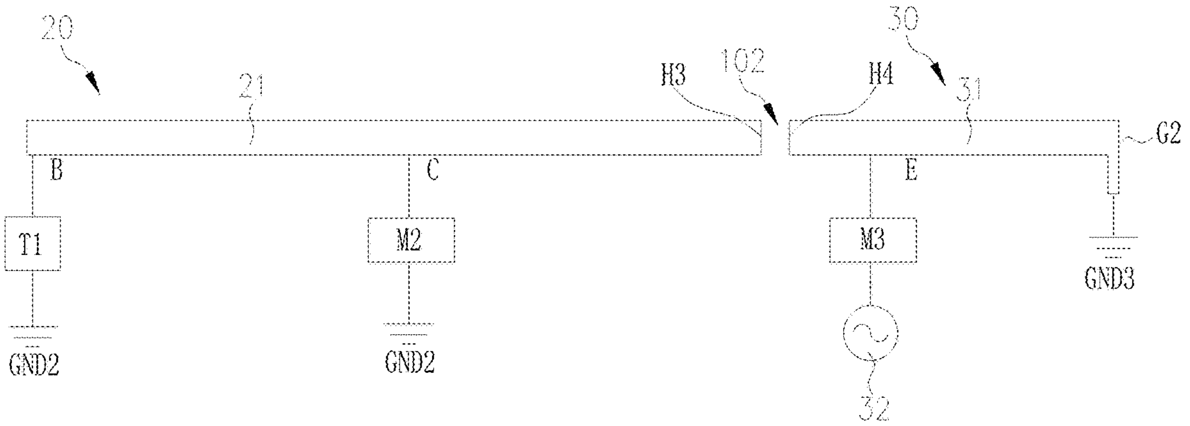
FIG. 19 is an equivalent circuit diagram of a third antenna element in FIG. 4.
Figure 20:
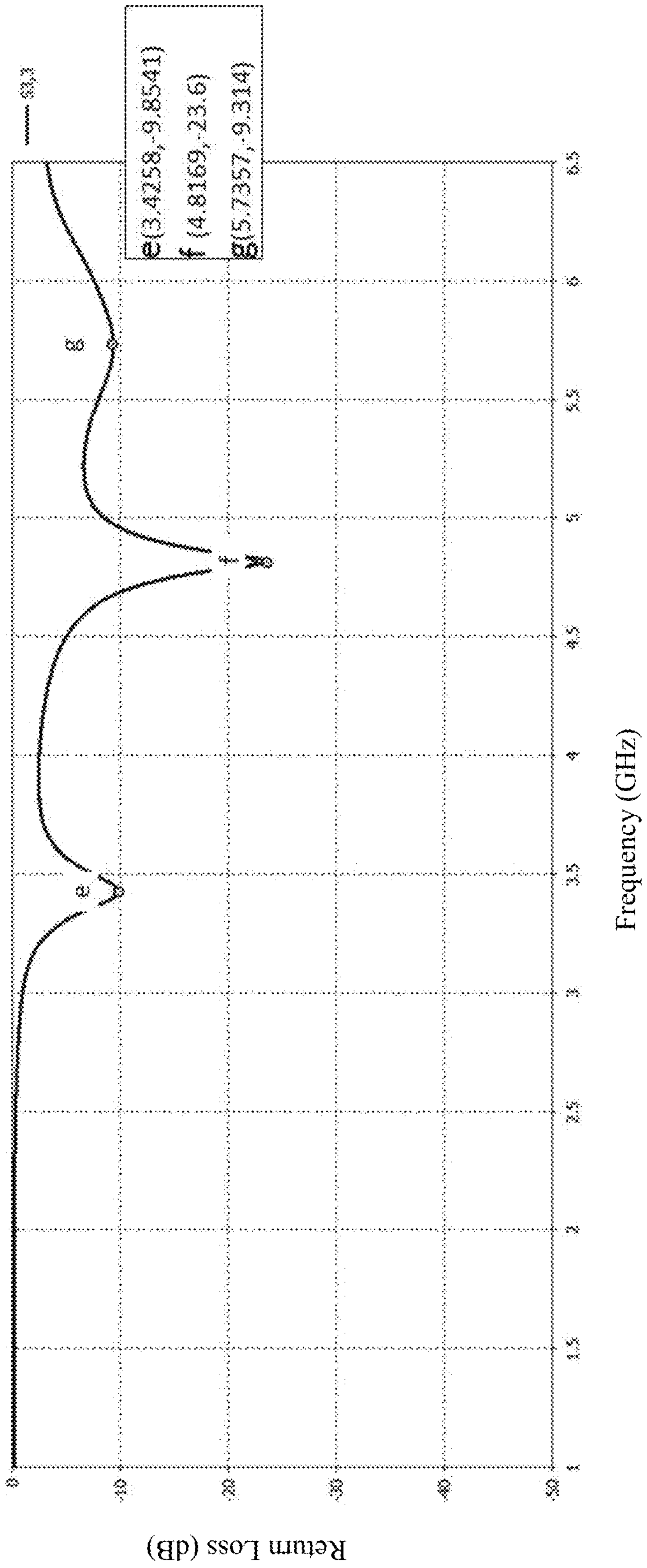
FIG. 20 is a return loss curve diagram of serval resonant modes of the third antenna element in FIG. 4.

Referring to FIG. 19, FIG. 19 is an equivalent circuit diagram of the third antenna element 30. The second antenna element 20 is configured to be in capacitive coupling with the third antenna element 30. Referring to FIG. 20, FIG. 20 is a return loss curve diagram of the third antenna element 30.

It can be understood that the disclosure, by designing an effective electrical length and structure of the third radiator 31 of the third antenna element 30, a position of the third feeding point, an effective electrical coupling length between the second radiator 21 and the third radiator 31, and the like, a resonant mode of a band with high practicability can be formed, thereby allowing electromagnetic wave transmission/reception of the band with high practicability. Further, an impedance matching of the third radiator 31 is adjusted by FT circuits (including the second FT circuit T2, the second frequency-selection filter circuit M2, and the third frequency-selection filter circuit M3), a shift towards HB or LB can be achieved in the resonant mode of the third antenna element 30, enabling the third antenna element 30 to have an ultra-bandwidth of the band with high practicability. The effective electrical length refers to a length of the third radiator 31 on which the third RF signal acts. The effective electrical length may be an actual length of the third radiator 31, and may also be slightly shorter or longer than the actual length of the third radiator 31.

As illustrated in FIG. 19 and FIG. 20, by designing an effective electrical length of the third radiator 31, part of the third radiator 31 between the second ground end G2 and the fourth coupling end H4 is configured to generate a fifth resonant mode e and a sixth resonant mode funder excitation of the RF signal transmitted by the third signal source 32. In some implementations, by designing the effective electrical length of the third radiator 31, part of the third radiator 31 between the second ground end G2 and the fourth coupling end H4 is configured to resonate in the fifth resonant mode e and the sixth resonant mode funder excitation of the RF signal transmitted by the third signal source 32. By designing the position of the third feeding point E, part of the second radiator 21 between the coupling point B and the third coupling end H3 is configured to generate a seventh resonant mode g under excitation of the RF signal transmitted by the third signal source 32. In some implementations, by designing the position of the third feeding point E, part of the second radiator 21 between the coupling point B and the third coupling end H3 is configured to resonate in the seventh resonant mode g under excitation of the RF signal transmitted by the third signal source 32. A combination of a band of the fifth resonant mode e, a band of the sixth resonant mode f, and a band of the seventh resonant mode g ranges from 3 GHz to 6.5 GHz.

Further, the fifth resonant mode e is a ⅛ wavelength mode in which part of the third antenna element 30 between the second ground end G2 and the fourth coupling end H4 operates. Specifically, the fifth resonant mode e is a ¼ to ⅛ wavelength mode in which part of the third antenna element 30 between the second ground end G2 and the fourth coupling end H4 operates. A band covered by the fifth resonant mode e includes, but is not limited to, the N77 band and the N78 band.

In an implementation, by designing an effective electrical length of the third radiator 31 between the second ground end G2 and the fourth coupling end H4, for example, by designing a length between the second ground end G2 and the fourth coupling end H4 to be about a value ranging from 1.1 cm to 2.2 cm, part of the third radiator 31 between the second ground end G2 and the fourth coupling end H4 can radiate in the fifth resonant mode e (i.e., the ⅛ wavelength mode) by adjusting the parameters of the second FT circuit T2, the second frequency-selection filter circuit M2, and the third frequency-selection filter circuit M3. For example, a resonant frequency of the fifth resonant mode e is about 3.4258 GHz.

Further, a distance between the third feeding point E and the second ground end G2 is greater than a distance between the third feeding point E and the fourth coupling end H4. The third feeding point E is close to the fourth coupling end H4. In other words, the third feeding point E is close to the second gap 102, so that the third feeding point E is a capacitive coupling feed point, and part of the third radiator 31 between the second ground end G2 and the fourth coupling end H4 is easier to be excited to generate the ⅛ wavelength mode, thereby better covering the N77 band and the N78 band and achieving a relatively high operating efficiency in the N77 band and the N78 band.

Further, the sixth resonant mode f is a ¼ wavelength fundamental mode in which part of the third antenna element 30 between the second ground end G2 and the fourth coupling end H4 operates. The third antenna element 30 has relatively high transmission/reception efficiency when operating in the sixth resonant model f. In other words, a band covered by the sixth resonant mode f of relatively high transmission/reception efficiency. The band covered by the sixth resonant mode f includes, but is not limited to, the Wi-Fi 5 GHz band.

In an implementation, by designing an effective electrical length of the second radiator 21 between the second feeding point C and the third coupling end H3, for example, by designing a length between the second feeding point C and the third coupling end H3 to be about 1.3 cm, part of the second radiator 21 between the second feeding point C and the third coupling end H3 can radiate in the sixth resonant mode f (i.e., the ¼ wavelength fundamental mode) by adjusting the parameters of the first FT circuit T1, the second frequency-selection filter circuit M2, and the third frequency-selection filter circuit M3. For example, a resonant frequency of the sixth resonant mode f is about 5.7357 GHz.

Further, the seventh resonant mode g is a ½ wavelength mode in which part of the third antenna element 30 between the coupling point B and the third coupling end H3 operates.

By designing capacitive coupling of three antenna elements, and designing a radiator, a feeding point, and a FT circuit of each antenna element, the antenna assembly 100 provided in the implementations of the disclosure can allow the first electromagnetic wave signal transmitted/received by the first antenna element 10 to cover at least the B40 band, the B41 band, the N41 band, the N78 band, and the N77 band. The B40 band ranges from 2.3 GHz to 2.5 GHz, the B41 band covers a frequency range of 2.5 GHz to 2.69 GHz, the N41 band covers a frequency range of 2.49 GHz to 2.69 GHz, the N78 band covers a frequency range of 3.3 GHz to 3.8 GHz, and the N77 band covers a frequency range of 3.3 GHz to 4.2 GHz. The second electromagnetic wave signal transmitted/received by the second antenna element 20 covers at least the GPS-L1 band, the Wi-Fi 2.4 GHz band, the LTE-MHB, and the NR-MHB. The GPS-L1 band covers 1.57542 GHz, the Wi-Fi 2.4 GHz band covers 2.4 GHz to 2.5 GHz, the LTE-MHB includes a B1 band, the B3 band, the B7 band, the B40 band, and the B41 band, where the B1 band covers a frequency range of 1.92 GHz to 1.98 GHz, the B3 band covers a frequency range of 1.71 GHz to 1.785 GHz, the B7 band covers a frequency range of 2.5 GHz to 2.57 GHz, the B40 band covers a frequency range of 2.3 GHz to 2.4 GHz, and the B41 band covers a frequency range of 2.496 GHz to 2.69 GHz. The NR-MHB includes an N1 band, the N3 band, the N7 band, the N40 band, and the N41 band, where the N1 band covers a frequency range of 1.920 MHz to 1.980 MHz, the N3 band covers a frequency range of 1.710 GHz to 1.785 GHz, the N7 band covers a frequency range of 2.500 GHz to 2.570 GHz, the N40 band covers a frequency range of 2.300 GHz to 2.400 GHz, the N41 band covers a frequency range of 2.496 GHz to 2.690 GHz. The third electromagnetic wave signal transmitted/received by the third antenna element 30 covers at least the N77 band, the N78 band, the N79 band, and Wi-Fi 5G band, where the N77 band covers a frequency range of 3.300 GHz to 4.200 GHz, the N78 band covers a frequency range of 3.300 GHz to 3.800 GHz, the N79 band covers a frequency range of 4.400 GHz to 5 GHz, and the Wi-Fi 5G band covers a frequency range of 5.150 GHz to 5.85 GHz. As such, the antenna assembly 100 can have a relatively large coverage and a relatively high radiation efficiency in a band (1 GHz to 6 GHz) with relatively high practicability. By designing the FT circuit, the antenna assembly 100 can be adjusted to a desired radiation band.

The first radiator 11 is spaced apart from and configured to be coupled to the second radiator 21, that is, the first radiator 11 and the second radiator 21 are shared-aperture (also known as common-aperture) radiators. The third radiator 31 is spaced apart from and configured to be coupled to the second radiator 21, that is, the third radiator 31 and the second radiator 21 are shared-aperture (also known as common-aperture) radiators. During operation of the antenna assembly 100, the first excitation signal generated by the first signal source 12 may be coupled to the second radiator 21 through the first radiator 11. In other words, during operation of the first antenna element 10, not only the first radiator 11 can be used to transmit/receive an electromagnetic wave signal, but also the second radiator 21 of the second antenna element 20 can be used to transmit/receive an electromagnetic wave signal, so that the first antenna element 10 can operate in a relatively wide band. Similarly, during operation of the second antenna element 20, not only the second radiator 21 can be used to transmit/receive an electromagnetic wave signal, but also the first radiator 11 of the first antenna element 10 and the third radiator 31 of the third antenna element 30 to transmit/receive electromagnetic wave signals, so that the second antenna element 20 can operate in a relatively wide band. Similarly, during operation of the third antenna element 30, the third antenna element 30 can not only use the third radiator 31 but also the second radiator 21 of the second antenna element 20 can be used to transmit/receive an electromagnetic wave signal, so that the third antenna element 30 can operate in a relatively wide band. In this way, cooperative multiplexing of the first radiator of the first antenna element and the second radiator of the second antenna element can be realized, and integration of multiple antenna elements can be realized, thereby reducing the overall size of the antenna assembly 100 while increasing the bandwidth, which facilitates the overall miniaturization of the electronic device 1000.

In the related art, a relatively large number of antenna elements or an increase in a length of a radiator is required to support the first resonant mode a, the second resonant mode b, the third resonant mode c, the fourth resonant mode d, the fifth resonant mode e, the sixth resonant mode f and the seventh resonant mode g, resulting in a relatively large size of the antenna assembly 100. In the implementations of the disclosure, one antenna assembly 100 can support the first resonant mode a, the second resonant mode b, the third resonant mode c, the fourth resonant mode d, the fifth resonant mode e, the sixth resonant mode f and the seventh resonant mode g, so that the antenna assembly 100 has a small size and a relatively small cost, and a space occupied by the antenna assembly 100 is also reduced, which reduces a difficulty in stacking the antenna assembly 100 with other devices, and also reduces a RF link insertion loss.

Figure 21:
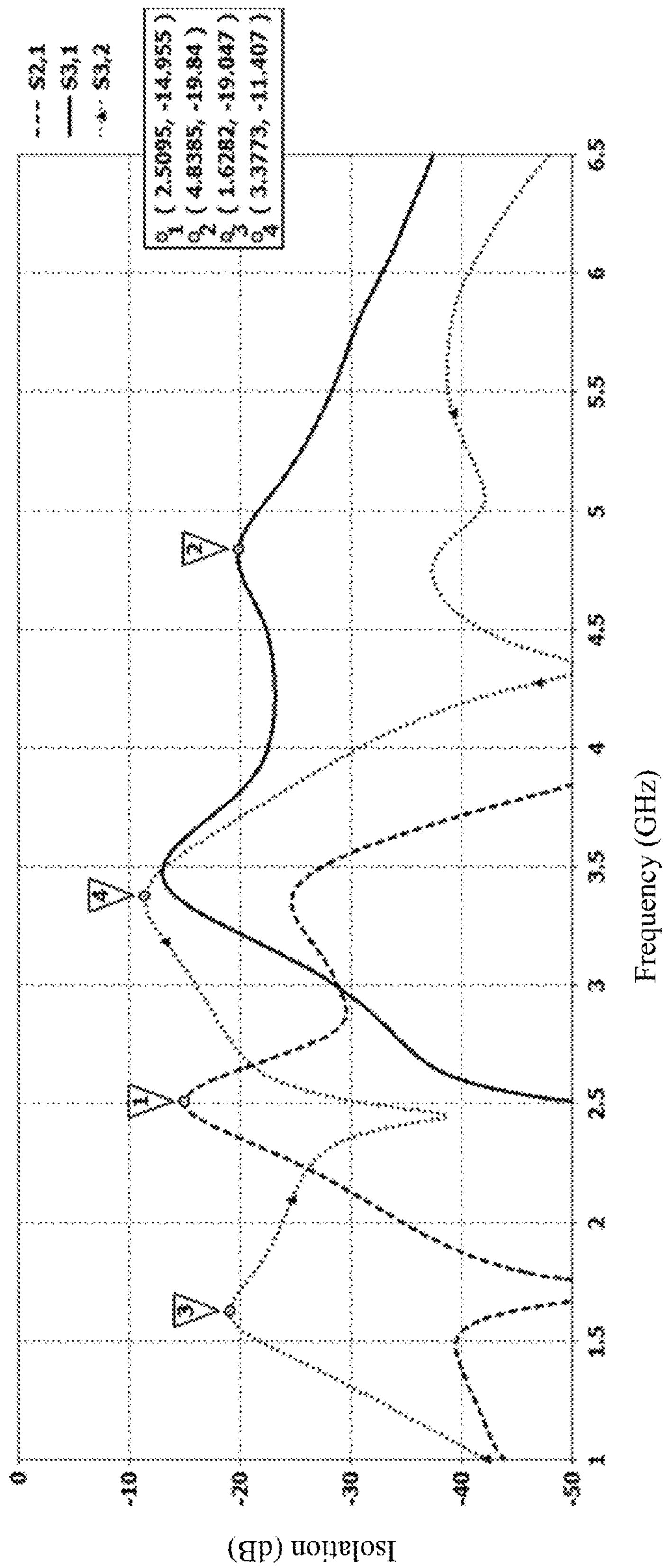
FIG. 21 is a diagram illustrating isolation between each two of the first antenna element, the second antenna element, and the third antenna element in FIG. 4.

Referring to FIG. 21, FIG. 21 is a diagram illustrating isolation between each two of the first antenna element 10, the second antenna element 20, and the third antenna element 30. S2,1 represents a curve of energy flow between the first antenna element 10 and the second antenna element 20. The smaller the S2,1, the smaller signal interference between the first antenna element 10 and the second antenna element 20, and the better isolation between the first antenna element 10 and the second antenna element 20. An energy flow value between the first antenna element 10 and the second antenna element 20 is less than −14.955, which indicates that the isolation between the first antenna element 10 and the second antenna element 20 is relatively high. Accordingly, S3,1 represents a curve of energy flow between the first antenna element 10 and the third antenna element.

S3,2 represents a curve of energy flow between the second antenna element 20 and the third antenna element. It can be seen from FIG. 21 that, the isolation between the first antenna element 10 and the second antenna element 20 is relatively high, and the isolation between the third antenna element and the second antenna element 20 is relatively high.

Figure 22:
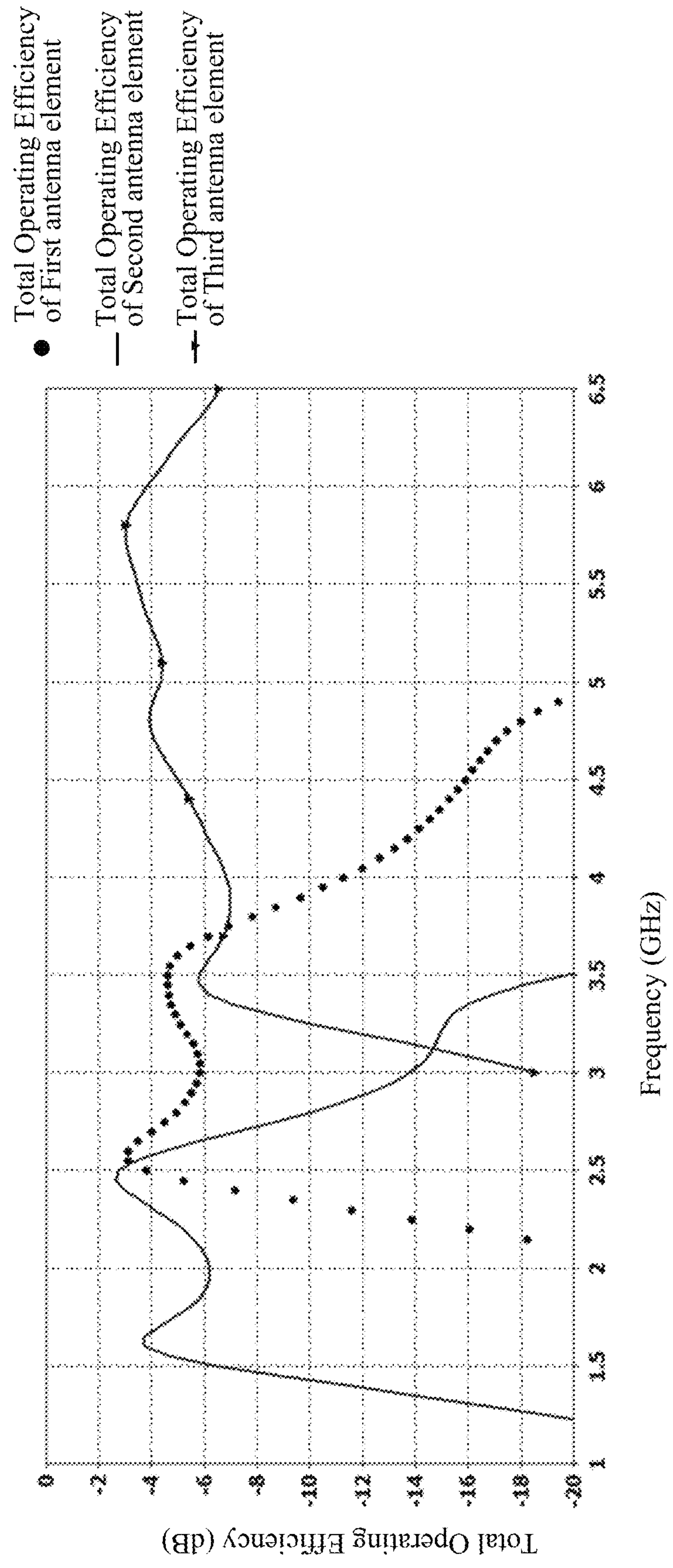
FIG. 22 is a diagram illustrating a total operating efficiency of the first antenna element in FIG. 4, a total operating efficiency of the second antenna element in FIG. 4, and a total operating efficiency of the third antenna element in FIG. 4.

Referring to FIG. 22, FIG. 22 is a diagram illustrating a total operating efficiency of the first antenna element 10, a total operating efficiency of the second antenna element 20, and a total operating efficiency of the third antenna element 30 in a complex integrated environment of a full-screen smartphone with limited clearance space. It can be seen from FIG. 22 that, each of the first antenna element 10, the second antenna element 20, and the third antenna element 30 in the antenna assembly 100 provided in the implementation of the disclosure has a relatively small return loss, and relatively good radiation efficiency.

The antenna assembly 100 is further provided in the implementations of the disclosure. The antenna assembly 100 can not only support transmission/reception of electromagnetic wave signals, but also can sense proximity of a subject to-be-detected, increasing the function of the antenna assembly 100, improving a component integration of the antenna assembly 100, and facilitating miniaturization of the electronic device 1000.

Figure 23:
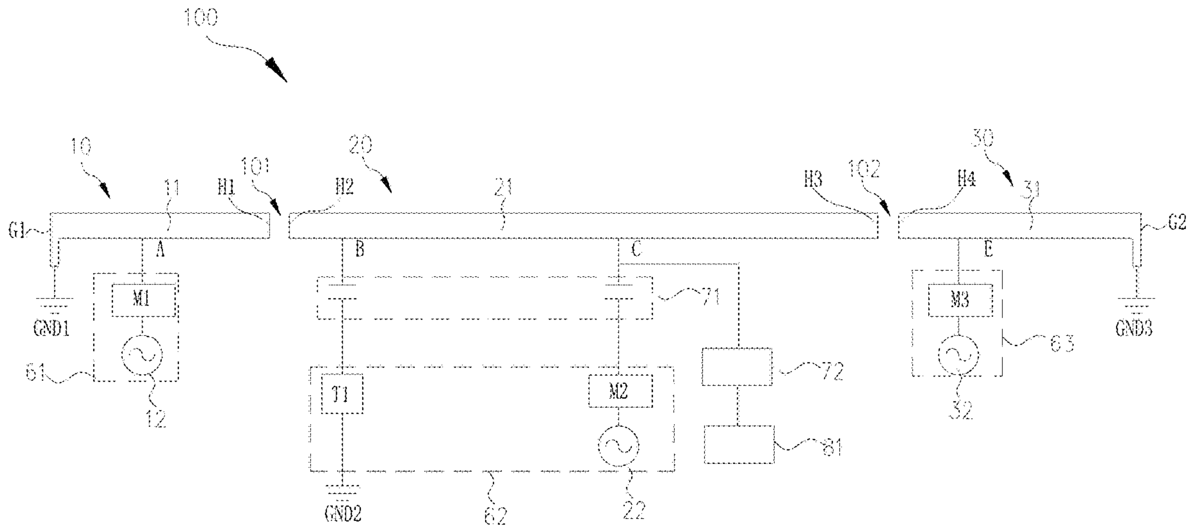
FIG. 23 is a schematic circuit diagram of a fourth type of antenna assembly in FIG. 3.

Referring to FIG. 23, the antenna assembly 100 further includes a first isolator 71, a second isolator 72, and a first proximity sensor 81. The first isolator 71 is electrically connected between the second radiator 21 and the second RF front-end unit 62.

Specifically, there are multiple first isolators 71. The first isolator 71 is disposed between the second radiator 21 and the second frequency-selection filter circuit M2 and between the second radiator 21 and the first FT circuit T1. The first isolator 71 is configured to isolate a first induction signal generated when the subject to-be-detected is close to the second radiator 21 and to allow electromagnetic wave signals transmitted/received by the second radiator 21 to pass. Specifically, the first isolator 71 includes at least a blocking capacitor, and the subject to-be-detected includes, but is not limited to, a human body.

One end of the second isolator 72 is electrically connected between the second radiator 21 and the first isolator 71, and the second isolator 72 is configured to isolate the electromagnetic wave signals transmitted/received by the second radiator 21 and to allow the first induction signal to pass. Specifically, the second isolator 72 includes at least a blocking inductor.

The first proximity sensor 81 is electrically connected to the other end of the second isolator 72 and is configured to sense a magnitude of the first induction signal.

When the subject to-be-detected is close to the second radiator 21, a proximity sensing signal generated by the second radiator 21 is a direct current signal. The electromagnetic wave signal is an alternating current signal. The first isolator 71 is disposed between the second radiator 21 and the second RF front-end unit 62, so that the first induction signal does not flow to the second RF front-end unit 62 through the second radiator 21, avoiding affecting signal transmission/reception of the second antenna element 20. The second isolator 72 is disposed between the first proximity sensor 81 and the second radiator 21, so that an electromagnetic wave signal does not flow to the first proximity sensor 81 through the second radiator 21, thereby improving an efficiency of sensing the proximity sensing signal by the first proximity sensor 81.

A specific structure of the first proximity sensor 81 is not limited herein. The first proximity sensor 81 includes, but is not limited to, a sensor configured to sense a capacitance change or a sensor configured to sense an inductance change.

The antenna assembly 100 further includes a controller 103. The controller 103 is electrically connected to one end of the first proximity sensor 81 away from the second isolator 72. The controller 103 is configured to determine, according to the magnitude of the first induction signal, whether the subject to-be-detected is close to the second radiator 21, and to reduce transmission power of the second antenna element 20 when the subject to-be-detected is close to the second radiator 21. Specifically, when the first proximity sensor 81 detects that the human body is close to the second antenna element 20, the transmission power of the second antenna element 20 can be reduced, thereby reducing a specific absorption rate of the human body to the electromagnetic wave signal transmitted by the second antenna element 20. When the first proximity sensor 81 detects that the human body is away from the second antenna element 20, the transmission power of the second antenna element 20 can be increased to enhance an antenna performance of the antenna assembly 100 without increasing the specific absorption rate of the human body to the electromagnetic wave signal transmitted by the second antenna element 20, such that the radiation performance of the electronic device 1000 can be intelligently adjusted, and a safety performance of the electronic device 1000 can be enhanced.

Figure 24:
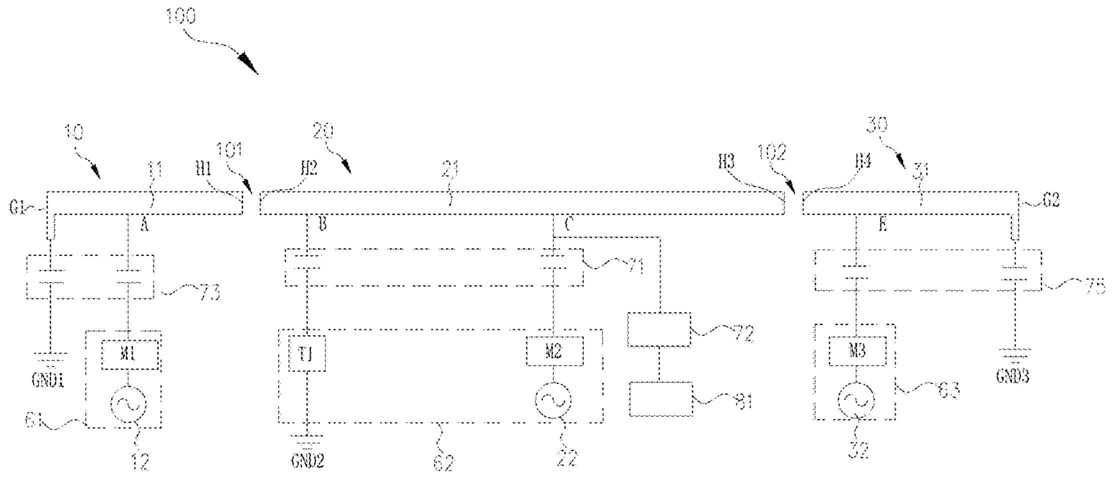
FIG. 24 is a schematic circuit diagram of a fifth type of antenna assembly in FIG. 3.

Referring to FIG. 24, the first antenna element 10 further includes a third isolator 73. The third isolator 73 is disposed between the first radiator 11 and the first RF front-end unit 61 and between the first ground end G1 and the first reference ground GND1. The third isolator 73 is configured to isolate a second induction signal generated when the subject to-be-detected is close to the first radiator 11 and to allow electromagnetic wave signals transmitted/received by the first radiator 11 to pass. Specifically, the third isolator 73 includes a blocking capacitor. The third isolator 73 is configured to enable the first radiator 11 to be in a floating state relative to the direct current signal.

In a first possible implementation, referring to FIG. 24, the second induction signal is configured to enable the second radiator 21 to generate an induction sub-signal through the coupling between the first radiator 11 and the second radiator 21. The first proximity sensor 81 is further configured to sense a magnitude of the induction sub-signal.

In the implementations, the first radiator 11 may serve as a sensing electrode for sensing proximity of the subject to-be-detected, and the second radiator 21 may serve as a sensing electrode for sensing proximity of the subject to-be-detected. A proximity-sensing path of the first radiator 11 may extend sequentially from the first radiator 11, the second radiator 21, to the first proximity sensor 81. In other words, when the subject to-be-detected is close to the first radiator 11, the first radiator 11 generates the second induction signal, and the second induction signal enables the second radiator 21 to generate the induction sub-signal through the coupling between the first radiator 11 and the second radiator 21, so that the first proximity sensor 81 can also sense the subject to-be-detected at the first radiator 11. There is no need to use two proximity sensors, and the coupling between the first radiator 11 and the second radiator 21, as well as the first proximity sensor 81, can be also fully utilized, which achieves a multiplexing of the first radiator 11 and the second radiator 21 in proximity detection, thereby increasing a utilization rate of components, reducing a quantity of components, and further improving an integration and miniaturization of the electronic device 1000.

Figure 25:
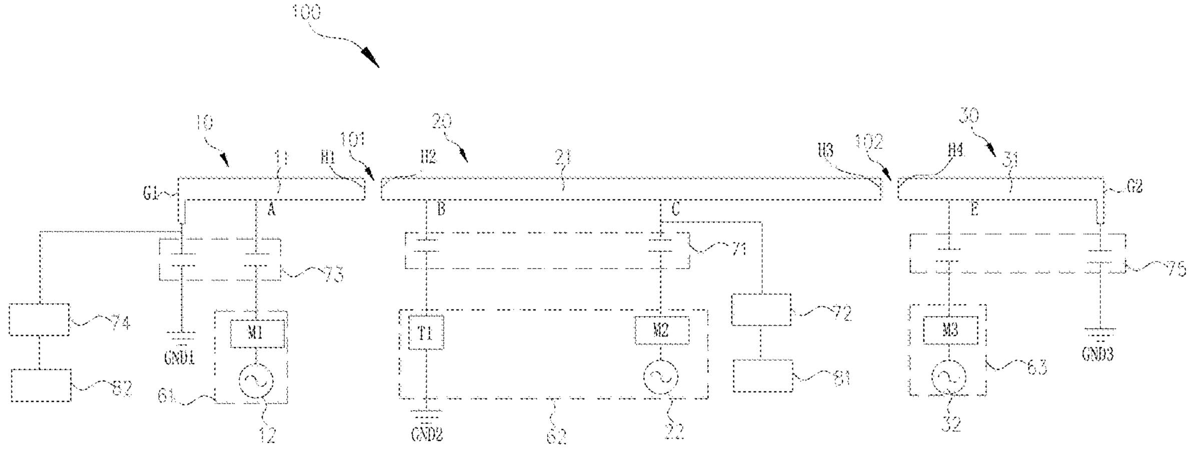
FIG. 25 is a schematic circuit diagram of a sixth type of antenna assembly in FIG. 3.

In another implementation, referring to FIG. 25, the antenna assembly 100 further includes a fourth isolator 74. One end of the fourth isolator 74 is electrically connected between the first radiator 11 and the third isolator 73 or electrically connected to the first radiator 11, and is configured to isolate the electromagnetic wave signals transmitted/received by the first radiator 11 and to allow the second induction signal to pass. Specifically, the fourth isolator 74 includes a blocking inductor.

Further, the antenna assembly 100 further includes a second proximity sensor 82. The second proximity sensor 82 is electrically connected to the other end of the fourth isolator 74 and is configured to sense a magnitude of the second induction signal. Specifically, the first radiator 11 may serve as a sensing electrode for sensing proximity of the subject to-be-detected, and the second radiator 21 may serve as a sensing electrode for sensing proximity of the subject to-be-detected. The proximity-sensing path of the first radiator 11 is independent of a proximity-sensing path of the second radiator 21, so that proximity of the subject to-be-detected to the first radiator 11 can be accurately detected and responded in time, and proximity of the subject to-be-detected to the second radiator 21 can be accurately detected and responded in time. Specifically, when the subject to-be-detected is close to the first radiator 11, the second induction signal generated by the first radiator 11 is a direct current signal. The electromagnetic wave signal is an alternating current signal. By arranging the third isolator 73 between the first radiator 11 and the first RF front-end unit 61, the second induction signal does not flow to the first RF front-end unit 61 through the first radiator 11, avoiding affecting signal transmission/reception of the first antenna element 10. By arranging the fourth isolator 74 between the second proximity sensor 82 and the first radiator 11, the electromagnetic wave signal does not flow to the second proximity sensor 82 through the first radiator 11, improving sensing efficiency of the second proximity sensor 82 for the second induction signal.

In other implementations, an induction signal of the second radiator 21 can be transmitted to the second proximity sensor 82 through the first radiator 11 by utilizing the coupling between the second radiator 21 and the first radiator 11.

Figure 26:
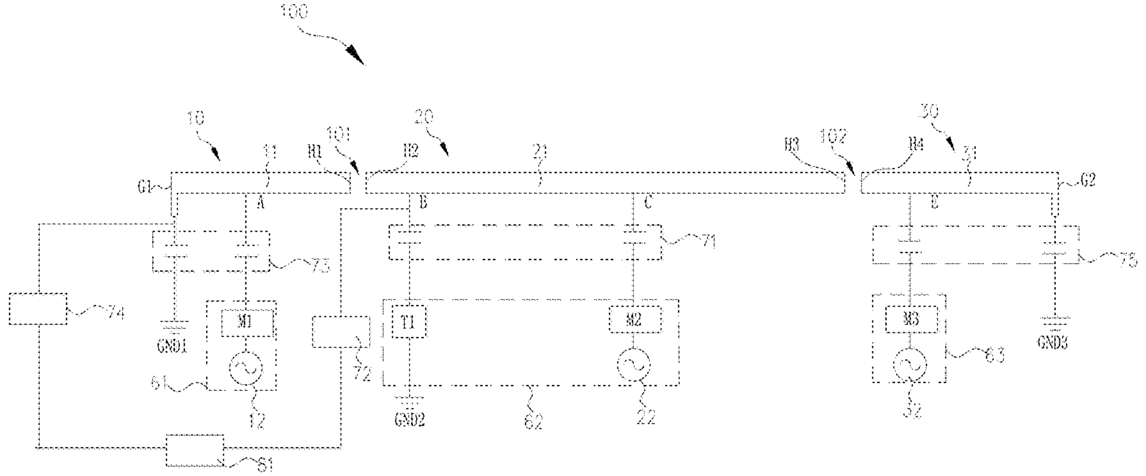
FIG. 26 is a schematic circuit diagram of a seventh type of antenna assembly in FIG. 3.

In a third possible implementation, referring to FIG. 26, the other end of the fourth isolator 74 is electrically connected to the first proximity sensor 81. The first radiator 11 and the second radiator 21 are configured to generate a coupling induction signal when the first radiator 11 is in capacitive coupling with the second radiator 21. The first proximity sensor 81 is further configured to sense a change in the coupling induction signal when the subject to-be-detected is close to the first radiator 11 and/or the second radiator 21.

Specifically, when the first radiator 11 and the second radiator 21 are coupled to each other, a constant electric field is generated, which leads to a stable coupling induction signal. When a human body is close to the constant electric field, the constant electric field changes, which leads to a change in the coupling induction signal, so that proximity of the human body can be detected according to the change in the coupling induction signal.

In the implementations, both the first radiator 11 and the second radiator 21 serve as sensing electrodes, so that proximity of the human body to a region corresponding to the first radiator 11, proximity of the human body to a region corresponding to the second radiator 21, and/or proximity of the human body to a region corresponding to the first gap 101 can be accurately detected. There is no need to use two proximity sensors, and the coupling between the first radiator 11 and the second radiator 21, as well as the first proximity sensor 81, can be also fully utilized, which achieves the multiplexing of the first radiator 11 and the second radiator 21 in proximity detection, thereby improving the utilization rate of components, reducing the quantity of components, and further improving the integration and miniaturization of the electronic device 1000.

A specific structure of the second proximity sensor 82 is not limited herein. The second proximity sensor 82 includes, but is not limited to, a sensor configured to sense a capacitance change or a sensor configured to sense an inductance change.

Referring to FIG. 24, a fifth isolator 75 is disposed between the third radiator 31 and the third RF front-end unit 63 and between the third radiator 31 and the third reference ground GND3, so that the third radiator 31 can also detect proximity of the subject to-be-detected. The third radiator 31 may serve as a sensing electrode for sensing proximity of a human body. A specific sensing path of the third radiator 31 may be independent of the sensing path of the second radiator 21, or the third radiator 31 may be coupled to the second radiator 21 to transmit a sensing signal to the first proximity sensor 81, or the third radiator 31 may be in capacitive coupling with the second radiator 21 to generate and transmit a coupling sensing signal to the first proximity sensor 81. For a specific implementation of the third radiator 31, reference may be made to the implementations in which the first radiator 11 serves as the sensing electrode, which is not repeated herein.

Each of the first radiator 11, the second radiator 21, and the third radiator 31 can serve as a sensing electrode, so that a sensing-electrode area can be increased, and proximity of the subject to-be-detected can be further detected in a relatively large range, thereby further improving an adjustment accuracy of the radiation performance of the electronic device 1000.

The radiators of the antenna assembly 100 can be configured to transmit/receive electromagnetic wave signals, and also to be multiplexed as sensing electrodes that are configured to detect proximity of the subject to-be-detected such as the human body, and the sensing signal is isolated from the electromagnetic wave signal via the first isolator 71 and the second isolator 72, achieving the communication performance of the antenna assembly 100 and sensing the subject to-be-detected, and achieving intelligent adjustment of the radiation performance of the electronic device 1000, and further, enhancing security performance of the electronic device 1000, improving an utilization rate of the components of the electronic device 1000, and reducing an overall size of the electronic device 1000.

For the electronic device 1000, the antenna assembly 100 can be at least partially integrated with the housing 500 or disposed entirely within the housing 500.

Figure 27:
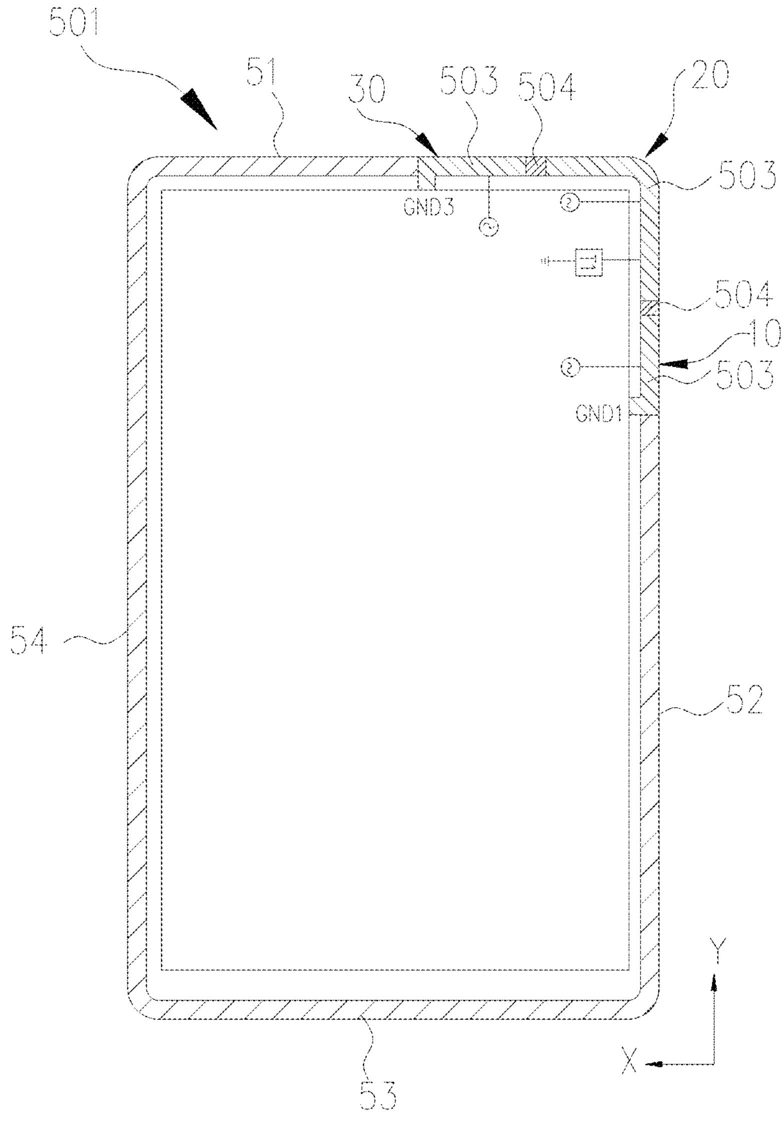
FIG. 27 is a schematic structural view of the first type of antenna assembly disposed at a housing provided in implementations of the disclosure.

In an implementation, referring FIG. 4 and FIG. 27, the antenna assembly 100 is at least partially integrated with the housing 500. Specifically, the reference ground 40, signal sources, FT circuits, and frequency-selection filter circuits of the antenna assembly 100 are all disposed at the main printed circuit board 200. The third radiator 311, the second radiator 21, and the third radiator 31 are integrated as part of the housing 500. Further, the housing 500 includes a middle frame 501 and a battery cover 502. The display screen 300, the middle frame 501, and the battery cover 502 sequentially fit with each other. The third radiator 3111, the second radiator 21, and the third radiator 31 are embedded in the middle frame 501 to serve as part of the middle frame 501.

In some implementations, the middle frame 501 includes multiple metal sections 503 and multiple insulation sections 504, where each insulation section 504 is arranged between two adjacent metal sections 503. The multiple metal sections 503 form the third radiator 3111, the second radiator 21, and the third radiator 31 respectively. The insulation section 504 between the third radiator 3111 and the second radiator 21 is filled in the first gap 101, and the insulation section 504 between the second radiator 21 and the third radiator 31 is filled in the second gap 102. Alternatively, the third radiator 311, the second radiator 21, and the third radiator 31 are embedded in the battery cover 502 to serve as part of the battery cover 502.

It can be understood that, in a case where a radiator serves as a sensing electrode, a surface of the radiator may be provided with a film layer which is insulated and has a high transmittance for electromagnetic waves.

Figure 28:
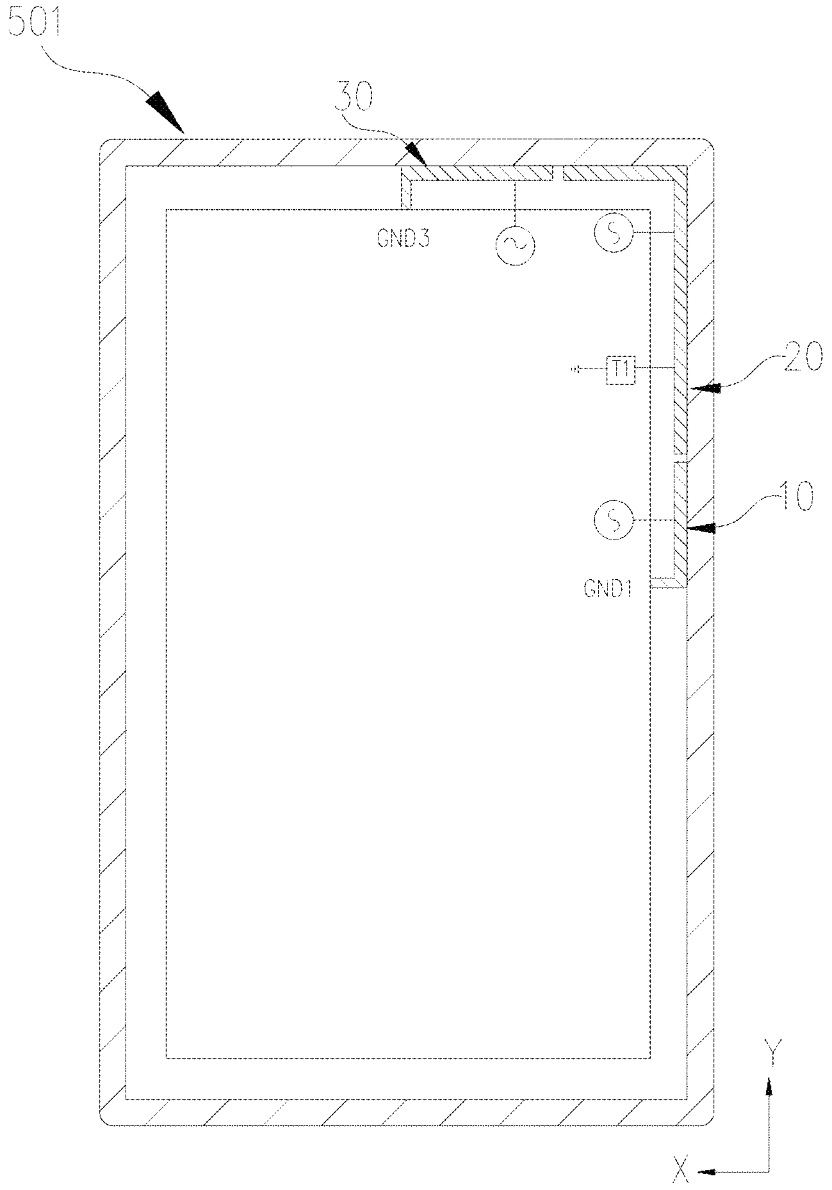
FIG. 28 is a schematic structural view of the second type of antenna assembly disposed in the housing provided in implementations of the disclosure.

In another implementation, referring to FIG. 4 and FIG. 28, the antenna assembly 100 is disposed within the housing 500. The reference ground 40, the signal sources, and the FT circuits of the antenna assembly 100 are disposed at the main printed circuit board 200. The third radiator 3111, the second radiator 21, and the third radiator 31 may be formed on a flexible circuit board and attached to an inner surface of the housing 500.

Referring to FIG. 28, the housing 500 includes a first edge 51, a second edge 52, a third edge 53, and a fourth edge 54 that are connected end to end in sequence. The first edge 51 is disposed opposite to the third edge 53. The second edge 52 is disposed opposite to the fourth edge 54. A length of the first edge 51 is less than a length of the second edge 52. A junction of two adjacent edges forms a corner of the housing 500.

In one implementation, referring to FIG. 28, the first antenna element 10 and part of the second antenna element 20 are disposed at the first edge 51, and the third antenna element 30 and another part of the second antenna element 20 are disposed at the second edge 52. Specifically, the third radiator 3111 is disposed at the first edge 51 or along the first edge 51 of the housing 500. The second radiator 21 is disposed at the first edge 51, the second edge 52, and a corner between the first edge 51 and the second edge 52. The third radiator 31 is disposed at the second edge 52 of the housing 500 or along the second edge 52. In a case where the second antenna element 20 serves as a sensing electrode for detecting proximity of the subject to-be-detected, since the second radiator 21 is disposed at the first edge 51 and the second edge 52, the second radiator 21 can detect whether the subject to-be-detected is close to the second radiator 21 in multiple directions, thereby improving an accuracy of detection of proximity of the subject to-be-detected by the electronic device 1000.

Further, when the electronic device 1000 is held by a user to be in a vertical direction, the first edge 51 is away from the ground, and the third edge 53 is close to the ground. When the user makes a phone call, the first edge 51 is close to the head of the user. When the user answers a call, the first edge 51 is close to the head of the user, a power of the first antenna element 10 is controlled to be reduced and a power of the third antenna element 30 is controlled to be increased. The controller 103 can reduce an electromagnetic wave transmission/reception power at a position close to the head of the subject to-be-detected, thereby reducing the specific absorption rate of the subject to-be-detected to electromagnetic waves.

The controller 103 is configured to control the power of the first antenna element 10 to be greater than the power of the third antenna element 30 when the display screen 300 is in a portrait mode. Specifically, when the display screen 300 is in the portrait mode or the electronic device 1000 is held by the user to be in the vertical direction, the second edge 52 and the fourth edge 54 may generally be covered by a finger. In this case, the controller 103 may control the first antenna element 10 disposed at the first edge 51 to transmit/receive electromagnetic wave signals, and thus electromagnetic wave signals can be transmitted/received even if the third antenna element 30 disposed at the second edge 52 is covered by the finger, thereby improving the communication quality of the electronic device 1000 in various usage scenarios.

The controller 103 is further configured to control the power of the third antenna element 30 to be greater than the power of the first antenna element 10 when the display screen 300 is in a landscape mode. Specifically, when the display screen 300 is in the landscape mode or the electronic device 1000 is holed by the user to be in a horizontal direction, the first edge 51 and the third edge 53 are generally covered by a finger. In this case, the controller 103 may control the third antenna element 30 disposed at the second edge 52 to transmit/receive electromagnetic wave signals, and thus electromagnetic wave signals can be transmitted/received even if the first antenna element 10 disposed at the first edge 51 is covered by the finger, thereby improving the communication quality of the electronic device 1000 in various usage scenarios.

Figure 29:
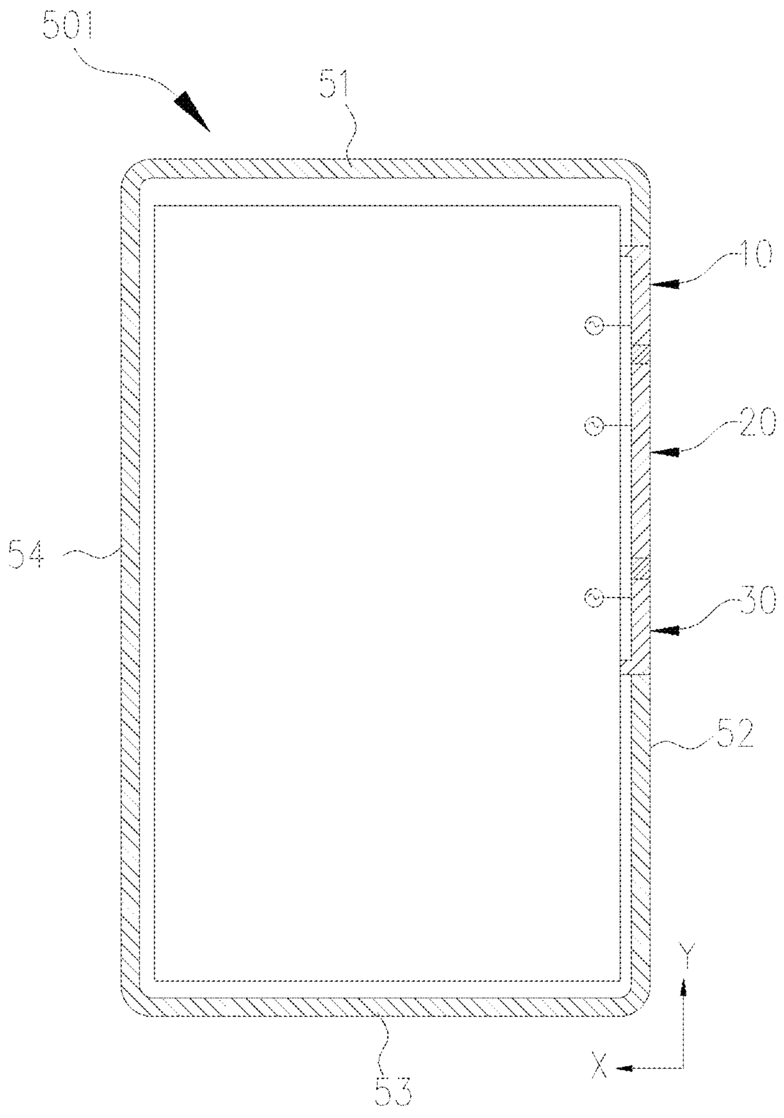
FIG. 29 is a schematic structural view of the third type of antenna assembly disposed at the housing provided in implementations of the disclosure.

In another implementation, referring to FIG. 29, the first antenna element 10, the second antenna element 20, and the third antenna element 30 are all disposed at the same edge of the housing 500.

The above are only some implementations of the disclosure. It should be noted that, a person skilled in the art may make further improvements and modifications without departing from the principle of the disclosure, and these improvements and modifications shall also belong to the scope of protection of the disclosure.

What is claimed is:

1. An antenna assembly comprising:

a first antenna element comprising a first radiator;

a second antenna element comprising a second radiator, wherein a first gap is defined between one end of the second radiator and one end of the first radiator, and at least part of the second radiator is configured to be coupled to the first radiator through the first gap; and a third antenna element comprising a third radiator, wherein a second gap is defined between the third radiator and the other end of the second radiator, and at least part of the third radiator is configured to be coupled to the second radiator through the second gap;

wherein an electromagnetic wave signal transmitted and received by the second antenna element under a coupling between the second radiator and the third radiator covers at least a global positioning system (GPS)-L1 band, a wireless fidelity (Wi-Fi) 2.4 GHz band, a long-term evolution middle-high band (LTE-MHB), and a new radio middle-high band (NR-MHB);

wherein the first radiator comprises a first ground end, a first coupling end, and a first feeding point disposed between the first ground end and the first coupling end, wherein the second radiator comprises a second coupling end and a coupling point disposed at one side of the second coupling end away from the first coupling end, and the first gap is defined between the second coupling end and the first coupling end, wherein part of the first radiator between the first feeding point and the first coupling end is configured to generate a second resonant mode under excitation of the first signal source;

wherein a length of the second radiator between the coupling point and the second coupling end is less than ¼ of a wavelength of an electromagnetic wave of a resonant frequency of the second resonant mode, and part of the second radiator between the coupling point and the second coupling end is configured to be in capacitive coupling with the first radiator.

2. The antenna assembly of claim 1, wherein an electromagnetic wave signal transmitted and received by the first antenna element covers at least the LTE-MHB, the NR-MHB, and a new radio ultra-high band (NR-UHB); and/or, an electromagnetic wave signal transmitted and received by the third antenna element covers at least the NR-UHB and a Wi-Fi 5 GHz band.

3. The antenna assembly of claim 1, wherein:

the first antenna element further comprises a first frequency-selection filter circuit and a first signal source, wherein one port of the first frequency-selection filter circuit is electrically connected to the first feeding point, and the first signal source is electrically connected to the other port of the first frequency-selection filter circuit; and the second antenna element further comprises a first frequency-tuning (FT) circuit, wherein one end of the first FT circuit is electrically connected to the coupling point, and the other end of the first FT circuit is grounded.

4. The antenna assembly of claim 3, wherein part of the first radiator between the first ground end and the first coupling end is configured to generate a first resonant mode under excitation of the first signal source, wherein a combination of a band of the first resonant mode and a band of the second resonant mode ranges from 2 GHz to 4 GHz.

5. The antenna assembly of claim 4, wherein the first resonant mode is a ¼ wavelength fundamental mode in which part of the first antenna element between the first ground end and the first coupling end operates, and the second resonant mode is a ¼ wavelength fundamental mode in which part of the first antenna element between the first feeding point and the first coupling end operates.

6. The antenna assembly of claim 3, wherein the first antenna element further comprises a second FT circuit, and the first radiator further comprises a FT point, wherein the FT point is disposed between the first feeding point and the first coupling end, one end of the second FT circuit is electrically connected to the FT point or the first frequency-selection filter circuit, and the other end of the second FT circuit is grounded.

7. The antenna assembly of claim 3, wherein:

the second radiator further comprises a second feeding point and a third coupling end, wherein the second feeding point is disposed between the coupling point and the third coupling end;

the second antenna element further comprises a second frequency-selection filter circuit and a second signal source, one end of the second frequency-selection filter circuit is electrically connected to the second feeding point, the second signal source is electrically connected to the other end of the second frequency-selection filter circuit, and the other end of the second frequency-selection filter circuit is grounded;

the third radiator further comprises a fourth coupling end, a third feeding point, and a second ground end that are arranged in sequence, wherein the second gap is defined between the fourth coupling end and the third coupling end; and the third antenna element further comprises a third frequency-selection filter circuit and a third signal source, wherein one end of the third frequency-selection filter circuit is electrically connected to the third feeding point, the third signal source is electrically connected to the other end of the third frequency-selection filter circuit, and the other end of the third frequency-selection filter circuit is grounded.

8. The antenna assembly of claim 7, wherein part of the second radiator between the coupling point and the third coupling end is configured to generate a third resonant mode under excitation of a radio frequency (RF) signal transmitted by the second signal source, and the third radiator and part of the second radiator between the second feeding point and the third coupling end are configured to corporately generate a fourth resonant mode under excitation of the RF signal transmitted by the second signal source, wherein a combination of a band of the third resonant mode and a band of the fourth resonant mode ranges from 1.5 GHz to 3 GHz.

9. The antenna assembly of claim 8, wherein the third resonant mode is a ¼ wavelength fundamental mode in which part of the second antenna element between the coupling point and the third coupling end operates, and the fourth resonant mode is a ¼ wavelength fundamental mode in which part of the second antenna element between the second feeding point and the third coupling end operates.

10. The antenna assembly of claim 7, wherein part of the third radiator between the second ground end and the fourth coupling end is configured to generate a fifth resonant mode and a sixth resonant mode under excitation of an RF signal transmitted by the third signal source, part of the second radiator between the coupling point and the third coupling end is configured to generate a seventh resonant mode under excitation of the RF signal transmitted by the third signal source, wherein a combination of a band of the fifth resonant mode, a band of the sixth resonant mode, and a band of the seventh resonant mode ranges from 3 GHz to 6.5 GHz.

11. The antenna assembly of claim 10, wherein the fifth resonant mode is a ⅛ wavelength mode in which part of the third antenna element between the second ground end and the fourth coupling end operates, the sixth resonant mode is a ¼ wavelength fundamental mode in which part of the third antenna element between the second ground end and the fourth coupling end operates, and the seventh resonant mode is a ½ wavelength mode in which part of the second antenna element between the coupling point and the third coupling end operates.

12. The antenna assembly of claim 11, wherein a distance between the third feeding point and the second ground end is greater than a distance between the third feeding point and the fourth coupling end.

13. The antenna assembly of claim 7, further comprising a first isolator, a second isolator, and a first proximity sensor, wherein the first isolator is disposed between the second radiator and the second frequency-selection filter circuit and between the second radiator and the first FT circuit, and the first isolator is configured to isolate a first induction signal generated when a subject to-be-detected is close to the second radiator and to allow an electromagnetic wave signal transmitted and received by the second radiator to pass; one end of the second isolator is electrically connected between the second radiator and the first isolator or electrically connected to the second radiator, and the second isolator is configured to isolate the electromagnetic wave signal transmitted and received by the second radiator and to allow the first induction signal to pass; and the first proximity sensor is electrically connected to the other end of the second isolator and is configured to sense a magnitude of the first induction signal.

14. The antenna assembly of claim 13, further comprising a third isolator, wherein the third isolator is electrically connected between the first ground end and a reference ground and electrically connected between the first feeding point and the first signal source, and is configured to isolate a second induction signal generated when the subject to-be-detected is close to the first radiator and to allow an electromagnetic wave signal transmitted and received by the first radiator to pass.

15. The antenna assembly according to claim 14, wherein the second induction signal is configured to enable the second radiator to generate an induction sub-signal through a coupling between the first radiator and the second radiator; and the first proximity sensor is further configured to sense a magnitude of the induction sub-signal.

16. The antenna assembly of claim 14, further comprising a fourth isolator, wherein one end of the fourth isolator is electrically connected between the first radiator and the third isolator or electrically connected to the first radiator, and is configured to isolate the electromagnetic wave signal transmitted and received by the first radiator and to allow the second induction signal to pass, and the other end of the fourth isolator is configured to output the second induction signal;

the antenna assembly further comprises a second proximity sensor, wherein the second proximity sensor is electrically connected to the other end of the fourth isolator and is configured to sense a magnitude of the second induction signal; or the other end of the fourth isolator is electrically connected to the first proximity sensor, the first radiator and the second radiator are configured to generate a coupling induction signal when the first radiator is in capacitive coupling with the second radiator, and the first proximity sensor is further configured to sense a change in the coupling induction signal when the subject to-be-detected is close to the first radiator and/or the second radiator.

17. The antenna assembly of claim 13, further comprising a controller, wherein the controller is electrically connected to one end of the first proximity sensor away from the second isolator, the controller is configured to determine, according to the magnitude of the first induction signal, whether the subject to-be-detected is close to the second radiator, and to reduce power of the second antenna element when the subject to-be-detected is close to the second radiator.

18. An electronic device, comprising:

a housing and an antenna assembly, wherein the antenna assembly is at least partially integrated at the housing; or the antenna assembly is disposed inside the housing;

wherein the antenna assembly comprises:

a first antenna element comprising a first radiator;

a second antenna element comprising a second radiator, wherein a first gap is defined between one end of the second radiator and one end of the first radiator, and at least part of the second radiator is configured to be coupled to the first radiator through the first gap; and a third antenna element comprising a third radiator, wherein a second gap is defined between the third radiator and the other end of the second radiator, and at least part of the third radiator is configured to be coupled to the second radiator through the second gap;

wherein an electromagnetic wave signal transmitted and received by the second antenna element under a coupling between the second radiator and the third radiator covers at least a global positioning system (GPS)-L1 band, a wireless fidelity (Wi-Fi) 2.4 GHz band, a long-term evolution middle-high band (LTE-MHB), and a new radio middle-high band (NR-MHB);

wherein the first radiator comprises a first ground end, a first coupling end, and a first feeding point disposed between the first ground end and the first coupling end, wherein the second radiator comprises a second coupling end and a coupling point disposed at one side of the second coupling end away from the first coupling end, and the first gap is defined between the second coupling end and the first coupling end, wherein part of the first radiator between the first feeding point and the first coupling end is configured to generate a second resonant mode under excitation of the first signal source;

wherein a length of the second radiator between the coupling point and the second coupling end is less than ¼ of a wavelength of an electromagnetic wave of a resonant frequency of the second resonant mode, and part of the second radiator between the coupling point and the second coupling end is configured to be in capacitive coupling with the first radiator.

19. The electronic device of claim 18, wherein the housing comprises a first edge, a second edge, a third edge, and a fourth edge that are connected end to end in sequence, the first edge is disposed opposite to the third edge, and the second edge is disposed opposite to the fourth edge, a length of the first edge is less than a length of the second edge, and the first radiator and part of the second radiator are disposed at the first edge, another part of the second radiator and the third radiator are disposed at the second edge; or the first radiator, the second radiator, and the third radiator are all disposed at a same edge of the housing.

20. The electronic device of claim 18, wherein the second antenna element further comprises a first frequency-tuning (FT) circuit, wherein one end of the first FT circuit is electrically connected to the coupling point, and the other end of the first FT circuit is grounded;

wherein the first antenna element further comprises a second FT circuit, and the first radiator further comprises a FT point, wherein the FT point is disposed between the first feeding point and the first coupling end, one end of the second FT circuit is electrically connected to the FT point or the first frequency-selection filter circuit, and the other end of the second FT circuit is grounded.

* * * * *